United States Patent
Cho

(10) Patent No.: US 10,943,276 B2
(45) Date of Patent: Mar. 9, 2021

(54) ELECTRONIC COMMERCE METHOD AND COMPUTER PROGRAM

(71) Applicant: Joon Ho Cho, Seoul (KR)

(72) Inventor: Joon Ho Cho, Seoul (KR)

( * ) Notice: Subject to any disclaimer, the term of this patent is extended or adjusted under 35 U.S.C. 154(b) by 355 days.

(21) Appl. No.: 15/740,176

(22) PCT Filed: Jun. 28, 2016

(86) PCT No.: PCT/KR2016/006874
§ 371 (c)(1),
(2) Date: Dec. 27, 2017

(87) PCT Pub. No.: WO2017/026651
PCT Pub. Date: Feb. 16, 2017

(65) Prior Publication Data
US 2018/0189849 A1    Jul. 5, 2018

(30) Foreign Application Priority Data
Aug. 10, 2015  (KR) ........................ 10-2015-0112405

(51) Int. Cl.
*G06Q 30/00* (2012.01)
*G06Q 30/06* (2012.01)
(Continued)

(52) U.S. Cl.
CPC ..... *G06Q 30/0609* (2013.01); *G06K 9/00281* (2013.01); *G06K 9/00288* (2013.01);
(Continued)

(58) Field of Classification Search
CPC . G06Q 30/0609; G06Q 30/06; G06K 9/00281
(Continued)

(56) References Cited

U.S. PATENT DOCUMENTS

| 7,689,465 B1 * | 3/2010 | Shakes ..................... G06K 9/78 |
| | | 705/27.1 |
| 8,688,579 B1 * | 4/2014 | Ethington ............ G06K 9/4609 |
| | | 705/42 |

(Continued)

FOREIGN PATENT DOCUMENTS

| JP | 2007-058323 A | 3/2007 |
| KR | 10-2001-0090174 A | 10/2001 |
| KR | 10-2001-0108810 A | 12/2001 |
| KR | 10-2006-0122690 A | 11/2006 |
| KR | 10-2013-0057148 A | 5/2013 |

OTHER PUBLICATIONS

Abbadi, L. (2012). Multi-factor authentication techniques for video applications over the untrusted internet (Order No. MR86928). Available from ProQuest Dissertations & Theses Global. (1365223345). (Year: 2012).*

*Primary Examiner* — Jason B Dunham
*Assistant Examiner* — Arielle E Weiner
(74) *Attorney, Agent, or Firm* — KORUS Patent, LLC; Seong Il Jeong

(57) ABSTRACT

Disclosed is an electronic commerce method. An electronic commerce method according to an embodiment of the present invention comprises the steps of: receiving a purchase request signal from a buyer; transmitting the purchase request signal to a seller; receiving a video captured of the seller who has checked the purchase request signal; and transmitting the received video to the buyer.

8 Claims, 22 Drawing Sheets

(51) Int. Cl.
*G06K 9/00* (2006.01)
*G06Q 20/08* (2012.01)
*H04N 21/437* (2011.01)
*H04N 21/4223* (2011.01)
*H04N 21/44* (2011.01)
*H04N 21/478* (2011.01)

(52) U.S. Cl.
CPC ....... *G06K 9/00295* (2013.01); *G06Q 20/085* (2013.01); *G06Q 30/06* (2013.01); *H04N 21/437* (2013.01); *H04N 21/4223* (2013.01); *H04N 21/44008* (2013.01); *H04N 21/47815* (2013.01)

(58) Field of Classification Search
USPC ...................................................... 705/26.35
See application file for complete search history.

(56) References Cited

U.S. PATENT DOCUMENTS

| | | | |
|---|---|---|---|
| 2008/0108456 A1* | 5/2008 | Bonito | A63B 71/06 473/409 |
| 2008/0275748 A1* | 11/2008 | John | G06Q 20/40 705/35 |
| 2010/0030779 A1* | 2/2010 | Tan | G06Q 10/10 707/758 |
| 2011/0066527 A1* | 3/2011 | Pearson | G06Q 10/0875 705/27.2 |
| 2013/0226765 A1* | 8/2013 | Tal | G06Q 40/04 705/37 |
| 2014/0328521 A1* | 11/2014 | Colangelo | H04L 67/18 382/118 |
| 2015/0142595 A1* | 5/2015 | Acuna-Rohter | G06Q 30/0185 705/21 |
| 2016/0321671 A1* | 11/2016 | Chandrasekaran | G06Q 20/40145 |
| 2017/0352256 A1* | 12/2017 | Miwa | G08B 25/04 |

* cited by examiner

ELECTRONIC COMMERCE METHOD AND COMPUTER PROGRAM

CROSS-REFERENCE TO RELATED APPLICATIONS

This patent application is a national-stage application of International Patent Application No. PCT/KR2016/006874, filed on Jun. 28, 2016, which claims priority under 35 U.S.C. § 119 to Korean Patent Application No. 10-2015-0112405, filed on Aug. 10, 2015, in the Korean Intellectual Property Office, the disclosures of which are incorporated by reference herein in their entireties.

TECHNICAL FIELD

The present invention relates to an electronic commerce method, and more specifically, to an electronic commerce method that allows a buyer to reliably purchase goods from a seller by providing a video taken of the seller to the buyer.

DISCUSSION OF RELATED ART

As Transport Control Protocol/Internet Protocol (TCP/IP)-based Internet is established, various communication networks are being integrated worldwide centered on the Internet TCP/IP (Transport Control Protocol/Internet Protocol), and accordingly, there are soaring Internet users. Further, different types of Internet services are exponentially increasing.

In particular, as the Internet grows, electronic commerce is sharply developing. Electronic commerce means a transaction of buying or selling goods through the Internet or various special services, such as for legal, medical, or insurance services.

However, electronic commerce, by the nature that goods are transacted in a virtual space, may be subject to damages.

Face-to-face transactions between seller and buyer, which are typical ways to sell and buy goods, are less likely to be subject to sale of defective products, fraud, or other damages. For electronic commerce, however, transactions occur with the buyer unable to identify the seller, which may be misused to cause damages.

Accordingly, there is an increasing need for a new-type electronic commerce method for enabling transactions with reliability established between seller and buyer.

SUMMARY

The present invention has been conceived to address the afore-mentioned problems. An object of the present invention is to provide an electronic commerce method to allow a seller to easily be identified upon purchasing a product in a web environment.

Another object of the present invention is to provide an electronic commerce method that allows electronic commerce face-to-face transactions between seller and buyer as in typical transactions.

Still another object of the present invention is to provide a new-type electronic commerce method that may establish reliability between seller and buyer in electronic commerce, minimize damages that may occur upon electronic commerce, and prompt electronic commerce.

Technical objects of the present invention are not limited to the foregoing objections, and other objects will be apparent to one of ordinary skill in the art from the detailed description as follows.

To achieve the foregoing objects, according to an embodiment of the present invention, an electronic commerce method comprises the steps of receiving a purchase request signal from a buyer, transmitting the purchase request signal to a seller, receiving a video taken of the seller identifying the purchase request signal, and transmitting the received video to the buyer.

According to an embodiment of the present invention, the video taken of the seller may be taken when the seller identifies product purchase information contained in the purchase request signal.

According to an embodiment of the present invention, a video capturing function may be activated when the seller identifies the product purchase information and remain active for a preset time, and when the preset time elapses, the video capturing function may be terminated.

According to an embodiment of the present invention, the step of receiving the video taken of the seller may include the step of notifying the buyer that the video taken of the seller has been received.

According to an embodiment of the present invention, the electronic commerce method may further comprise the step of performing payment upon receiving a final confirm signal from the seller having identified the video.

According to an embodiment of the present invention, the step of receiving the video taken of the seller may include the steps of detecting the seller's face from the video, and unless the seller's face is detected, transmitting a signal to request to retake.

According to an embodiment of the present invention, the step of receiving the video taken of the seller may include the steps of detecting the seller's face from the video, extracting a face feature point from the detected face of the seller, and transmitting a signal to request to retake when the face feature point is not detected.

According to an embodiment of the present invention, the step of receiving the video taken of the seller may include the steps of detecting the seller's face from the video, comparing the detected face of the seller with a plurality of images previously stored, and when none of the plurality of images match the detected face of the seller, sending a signal to request to retake.

According to an embodiment of the present invention, the electronic commerce method may further comprise the step of putting a restriction on the seller so that the seller cannot sell goods upon failing to receive a video meeting a preset requirement within a preset number of times.

According to an embodiment of the present invention, the electronic commerce method may further comprise the step of generating a blacklist constituted of sellers restricted not to sell goods.

According to an embodiment of the present invention, the electronic commerce method may further comprise the step of adding identifiers indicating that goods are sold by the sellers listed in the blacklist to the goods registered by the sellers listed in the blacklist.

According to an embodiment of the present invention, the step of transmitting the received video may include the steps of recognizing the face of the seller appearing in the video and transmitting a review corresponding to the recognized face of the seller along with the video.

According to an embodiment of the present invention, the electronic commerce method may further comprise the step of, when the seller is a legal organization or company constituted of a plurality of staff members, receiving information about the plurality of staff members, wherein the step of transmitting the video to the buyer includes the steps of recognizing a face of a staff member appearing in the video and transmitting the information about the recognized staff member along with the video.

According to another embodiment of the present invention, a computer program is recorded in a storage medium to execute, in association with a computing device, the steps of receiving a purchase request signal from a buyer, transmitting the purchase request signal to a seller, receiving a video taken of the seller identifying the purchase request signal, and transmitting the received video to the buyer.

By the above-described electronic commerce method according to an embodiment of the present invention, the video for the seller identifying the purchase request signal may be provided to the buyer, presenting similar effects to the purchase of goods offline.

Further, it is possible to prevent damages that may occur in electronic commerce.

Further, the video taken of the seller recognizable is provided to the buyer, allowing the buyer to purchase goods in relief.

DETAILED DESCRIPTION OF EXEMPLARY EMBODIMENTS

Hereinafter, preferred embodiments of the present invention are described in detail. Advantages and features of the present invention and methods for achieving the same will be apparent from embodiments described below in detail with reference to the accompanying drawings. However, the present invention is not limited to the embodiments disclosed herein and may rather be embodied in other various forms. The embodiments disclosed herein are provided simply to fully disclose the present invention and to indicate the category of the present invention to one of ordinary skill in the art. The present invention is defined by the appended claims. The same reference denotations refer to the same elements throughout the specification.

Unless defined otherwise, all the terms (either technical or scientific) used herein may be intended to mean ones commonly understood by those skilled in the art to which the present invention pertains. Terms defined in dictionaries typically used, unless clearly defined otherwise, should not be construed ideally or overly.

Unless stated specifically, a singular form used herein may also include a plural form. The terms "comprise" and/or "comprising" as used herein do not exclude the presence or addition of one or more other components, steps, operations, and/or elements to ones already mentioned.

Figure 1:
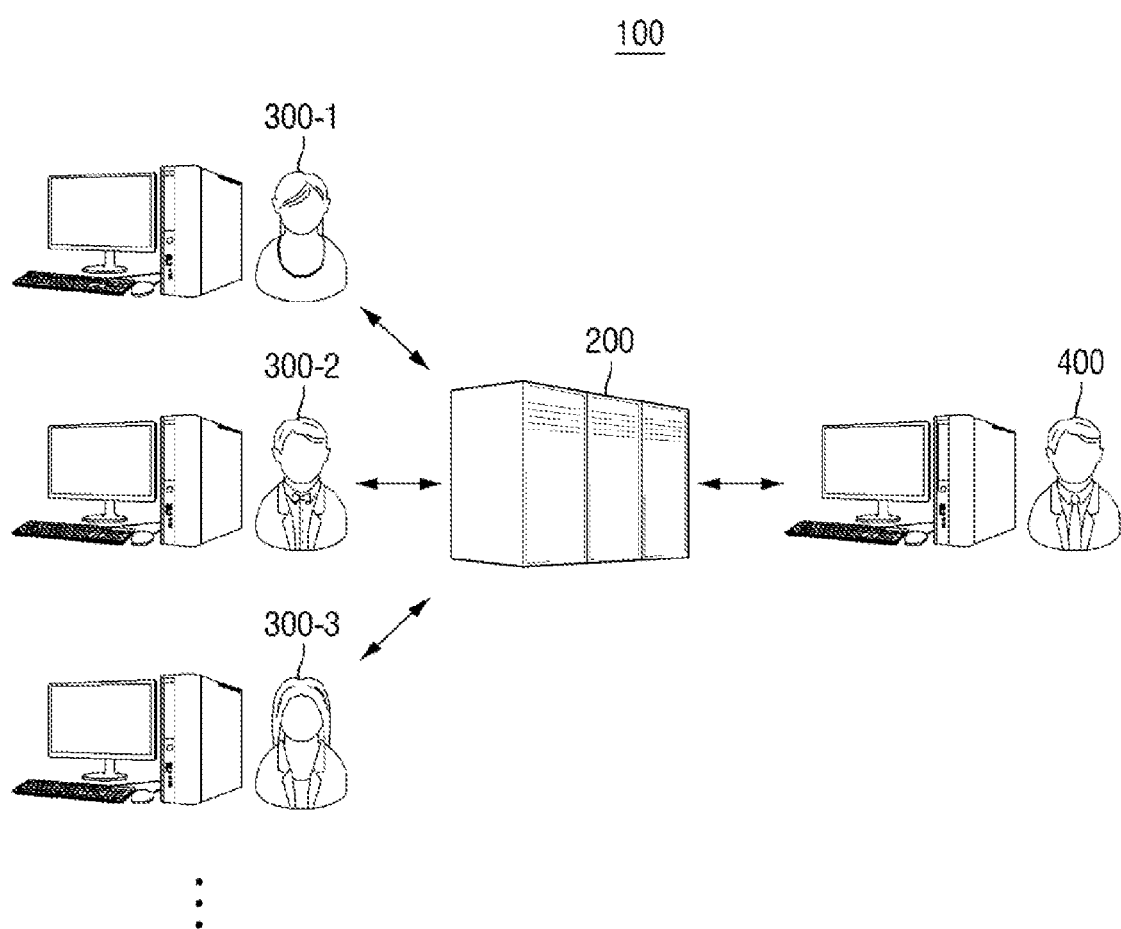
FIG. 1 is a view illustrating an electronic commerce system according to an embodiment of the present invention.

FIG. 1 is a view illustrating an electronic commerce system according to an embodiment of the present invention.

In this embodiment, an example is described in which a plurality of buyers purchase goods from a single seller. However, this is merely an example for ease-of-description purposes. For example, the same may also be implemented in cases where transactions of goods are made between multiple sellers and multiple buyers.

An electronic commerce system according to an embodiment of the present invention includes a managing server 200 that implements an electronic commerce method between seller and buyer, a plurality of buyers 300-1, 300-2, and 300-3, and a seller 400.

The plurality of buyers 300-1, 300-2, and 300-3 and the seller 400 may access the managing server 200 using smartphones, tablet PCs, desktop PCs, or laptop computers, to access the managing server 200 and purchase goods.

Specifically, if the seller 400 registers information about goods for sale in the managing server 200, the plurality of buyers 300-1, 300-2, and 300-3 may access the managing server 200, search for goods, and select and buy desired goods.

The managing server 200 may allow the buyers 300-1, 300-2, and 300-3 to purchase their desired goods from the seller 400 through an electronic commerce method according to an embodiment of the present invention.

The managing server 200 may store various pieces of goods information that the seller 400 has registered as described above. The managing server 200 may transmit goods purchase request signals from the buyers 300-1, 300-2, and 300-3 to the seller 400, receive a video taken of the seller 400, and transmit the video to the buyers 300-1, 300-2, and 300-3.

The managing server 200 may be connected through a dedicated communication line to a bank or credit card company to allow the buyers 300-1, 300-2, and 300-3 to pay for goods and make a request to provide the payments to the seller 400.

Now described is an electronic commerce method by the managing server 200 according to an embodiment of the present invention.

Figure 2:
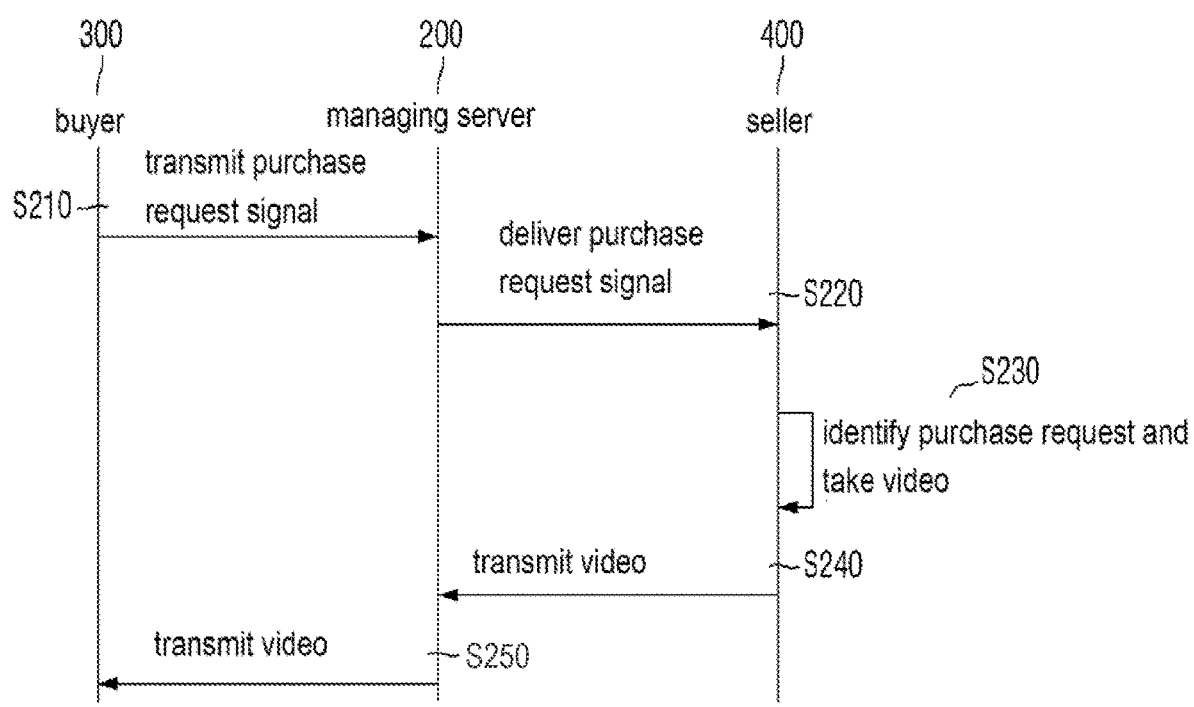
FIG. 2 is a flowchart illustrating an electronic commerce method according to an embodiment of the present invention.

FIG. 2 is a flowchart illustrating an electronic commerce method according to an embodiment of the present invention.

A buyer 300 may access the managing server 200 through his terminal device and may then select a product that he desires to purchase. For example, the buyer 300 may access the managing server 200 through a website or an electronic commerce application installed on the terminal device and select his desired product.

If the buyer 300 selects a product that he desires to purchase through his terminal device, a purchase request signal is transmitted to the managing server 200 (S210).

Upon receiving the purchase request signal, the managing server 200 transmits the seller 400 of the product corresponding to the purchase request signal (S220).

Upon receiving the purchase request signal, the seller 400 may identify information regarding the buyer 300 who has purchased goods of the seller 400 and information about orders. For example, the seller 400 may identify information regarding the product that the buyer 300 desires to purchase, information about the number of products ordered, and contact information, e.g., address, about the seller 400.

When the seller 400 identifies the purchase request signal for the buyer 300, a video may be taken of the seller 400A (S20). In other words, a video may be taken of the seller 400 to overcome the risk or limitation on electronic commerce where the buyer 300 should purchase and pay for a product while he cannot identify the face of the seller 400 in the virtual space.

The video taken of the seller 400 may be transmitted to the managing server 200 (S240). The managing server 200 may transmit the video to the buyer 300 (S250) so that the buyer 300 may identify, in real-time, the seller 400 who is identifying the purchase request signal.

As set forth above, providing the video for the seller 400 who identifies the purchase request signal to the buyer 300 may present similar effects to ones achieved upon purchasing goods offline.

In other words, this method allows the buyer 300 to make a face-to-face transaction with the seller 400 although it is an indirect way, allowing the buyer 300 a safe transaction with reliability while preventing the seller 400 from selling defective goods, hiding himself behind the anonymous space.

Now described in detail is a process in which, after selecting a product, the buyer 300 receives a video taken of the seller 400.

Figure 3:
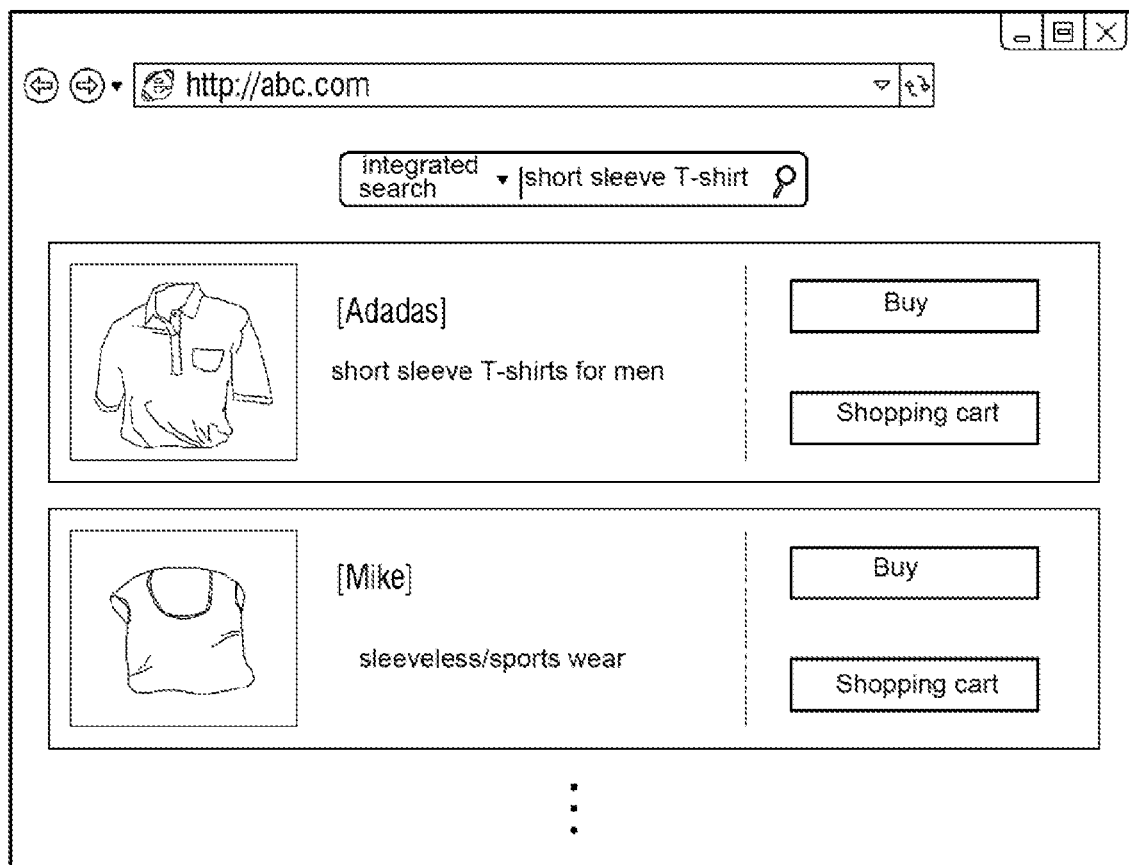
FIG. 3 is a view illustrating a process for a buyer to select a good to be purchased through a website or application according to an embodiment of the present invention.

FIG. 3 is a view illustrating a process for a buyer to select a product to be purchased through a website or application according to an embodiment of the present invention.

Although an example is herein described in which the buyer 300 accesses the managing server 200 to select a product to be purchased through a website, such an implementation is also possible in which goods are purchased through an application installed on a smartphone or tablet PC.

The buyer 300 may search a goods purchase website for goods and select a product that he desires to purchase. For example, if the buyer 300 selects a "Buy" button on the screen shown in FIG. 3, a purchase request signal for the product is transmitted to the managing server 200.

Specifically, the purchase request signal may include information about the type and quantity of the product that the buyer 300 selects, as well as personal information about the buyer 300 and shipping information, e.g., the address or destination to which to be shipped.

Accordingly, the seller 400 may ship the product that the buyer 300 has purchased through the purchase request signal for the buyer 300.

Figure 4:
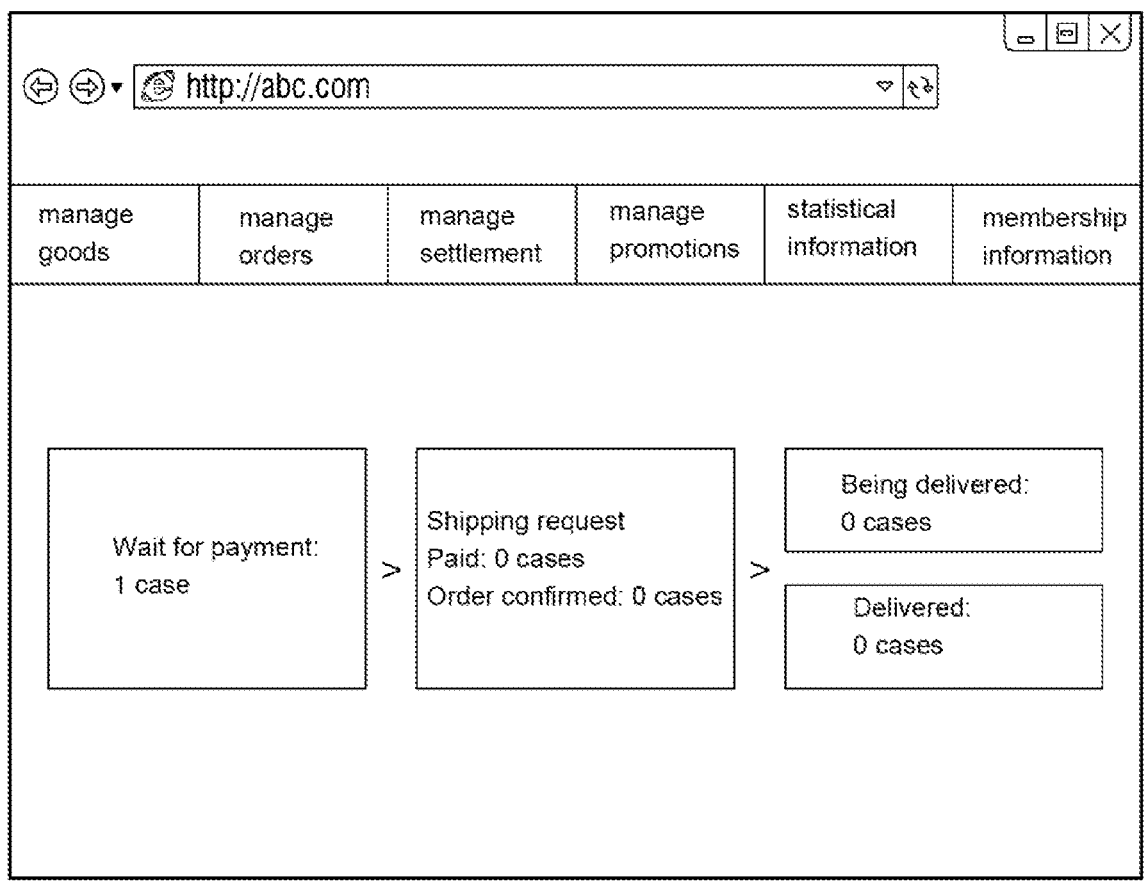
FIG. 4 is a view illustrating a process for a seller to identify a purchase request signal according to an embodiment of the present invention.

FIG. 4 is a view illustrating a process for a seller to identify a purchase request signal according to an embodiment of the present invention.

If the buyer 300 transmits a purchase request signal, the managing server 200 transmits the purchase request signal to the seller 400. The seller 400 may identify who the buyer 300 is and how many products the buyer 300 purchases through the purchase request signal provided from the managing server 200.

According to an embodiment of the present invention, the managing server 200 may divide the purchase procedure into "Wait for payment," "Request to ship," "Being delivered," and "Delivered" steps and display the steps.

Accordingly, the seller 400 may grasp the status of delivery of goods for multiple buyers 300 at a glance. For example, if a purchase request signal was received from the buyer 300 and payment for the purchase request is incomplete, the screen shown in FIG. 4 may be displayed.

Thus, the seller 400 may select the "Wait for payment" menu item on the screen to identify the purchase request signal of the buyer 300.

When the seller 400 identifies the purchase request signal of the buyer 300, a video may be taken of the seller 400. As described above, since the purchase request signal contains the personal information and address information about the buyer 300 as well as the information about the type and quantity of the product that the buyer 300 has selected, the seller 400 needs to identify the information to ship the product.

As such, a real-time video may be taken of the seller when the seller 400 identifies the purchase request signal.

Figure 5:
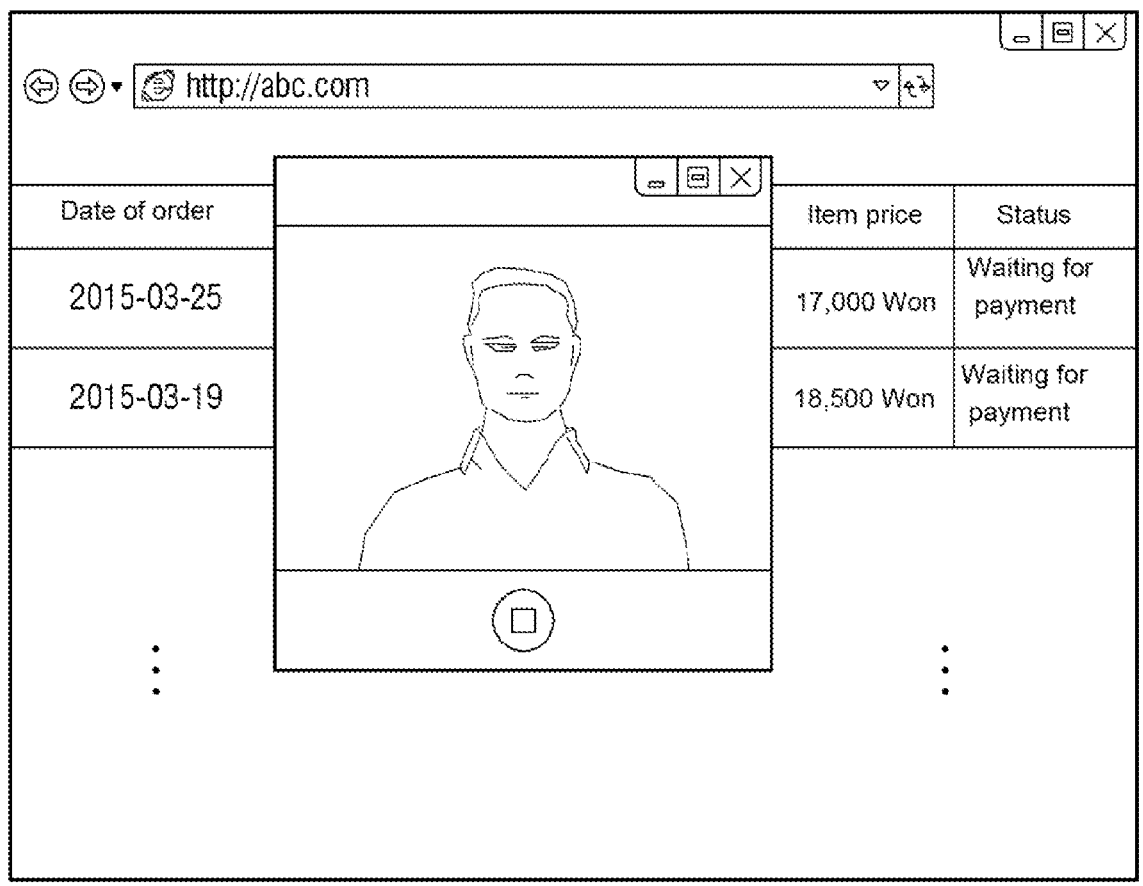
FIG. 5 is a view illustrating a process for taking an image of a seller according to an embodiment of the present invention.

FIG. 5 is a view illustrating a process for taking a video of a seller according to an embodiment of the present invention.

An electronic commerce method according to an embodiment of the present invention may take a video of the seller 400 identifying the purchase request signal.

Specifically, if the seller 400 selects a menu item for identifying purchase details of the buyer 300, a video capturing function may be activated to take a video of the seller 400.

This addresses the problem that the buyer 300 cannot identify the seller 400 as goods or products are transacted in virtual space. In particular, as a real-time video is taken of the seller 400 identifying the purchase request signal, the buyer 300 may have more reliability as compared with the ways in which the seller 400 randomly captures and registers his images.

The video capturing function may be automatically activated regardless of whether the seller 400 intended or not. The activated video capturing function may remain active for a predetermined time to take a video of the seller 400.

If the predetermined time elapses, the video capturing function may be terminated, and the video for the seller 400 may be transmitted to the managing server 200. While the video is being taken, the seller 400 may make a comment to provide, e.g., the delivery schedule or information about the product that the buyer 300 has purchased.

Through the above-described process, the captured video of the seller 400 may be provided to the buyer 300, so that the buyer 300 may identify the seller 400 who is selling the product that the buyer 300 has purchased.

Meanwhile, although an example has been described above in which the video capturing function is activated when the seller 400 identifies the purchase details for the buyer 300, the time when the video capturing function is activated is not limited thereto. For example, other various implementations may also be made in which the video capturing function is activated at other various times, e.g., when a product to sell by the seller 400 is registered in the managing server 200 or when a product is shipped or delivered.

Figure 6:
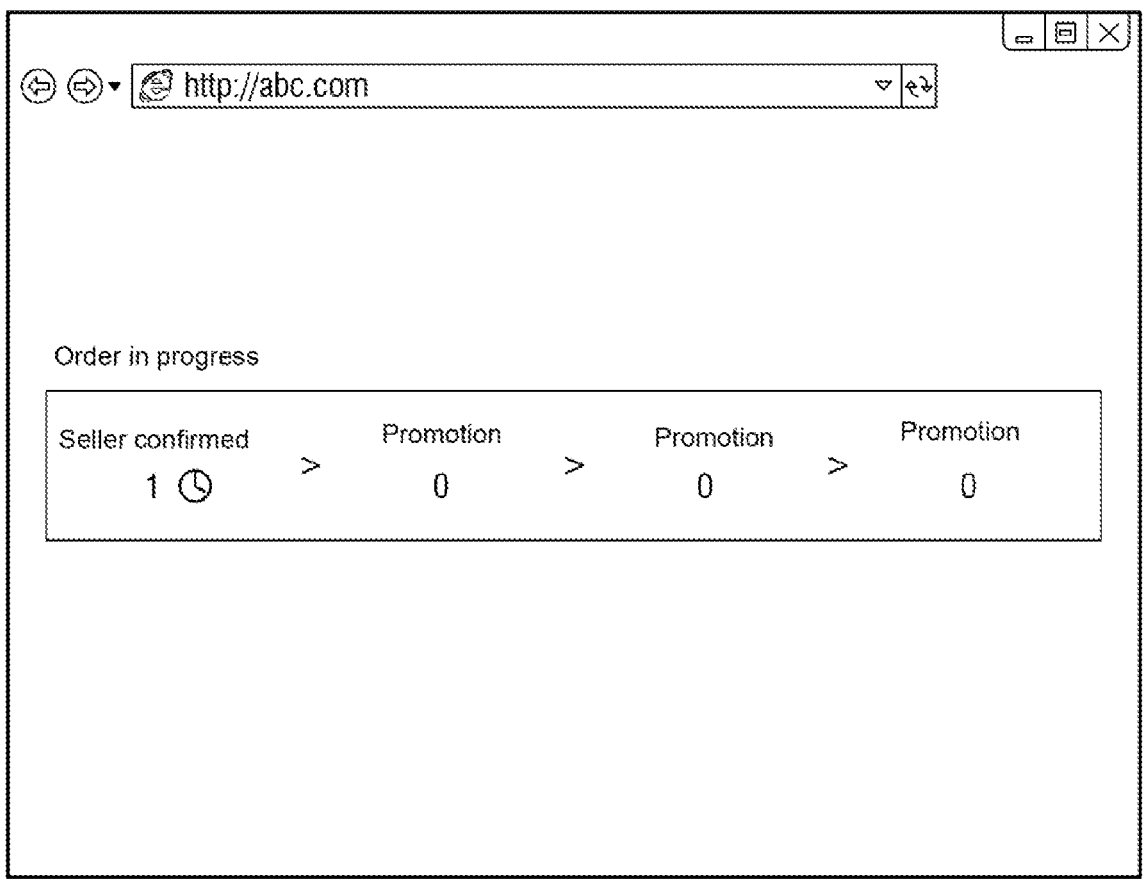
FIG. 6 is a view illustrating an example in which a video taken of a seller is provided to a buyer according to an embodiment of the present invention.

FIG. 6 is a view illustrating an example of providing a video taken of a seller to a buyer according to an embodiment of the present invention.

Upon receiving a video taken of the seller 400, the managing server 200 notifies the buyer 300 that the video has been taken, allowing the buyer 300 to view or identify the seller 400.

Specifically, the managing server 200 may divide the purchase procedure for the buyer 300 into "Identify seller," "Paid," "Ready to ship," and "Being delivered" steps and display the steps.

Upon receiving the video taken of the seller 400 from the terminal device of the buyer 300, the managing server 200 notifies the buyer 300 that the video of the buyer 300 has been registered.

If the buyer 300 selects the "Identify seller" menu item on the screen shown in FIG. 6, the video taken of the seller 400 may be displayed. For example, the video of the seller 400 registered in the managing server 200 may be downloaded or streamed to the terminal device of the buyer 300.

The buyer 300 may identify the seller 400 through the above process. In other words, the buyer 300 may identify, through the video, information about, e.g., the seller of the product that the buyer 300 intended to purchase and the current status of delivery of the product that the buyer 300 has ordered.

This way allows the buyer 300 to enjoy the same effects as if he makes a face-to-face transaction with the seller 400 offline although it may be indirect. Further, after identifying the video taken of the seller 400, the buyer 300 may make a final decision as to whether to purchase the product.

For example, where the seller 400 differs between the picture for the seller 400 registered in the goods selling homepage and the video taken of the seller 400, the seller 400 may be determined to be in question, and a hold may be put on the purchase of the product. This is why ones who attempt to sell goods in an abnormal way are generally reluctant to expose their face.

Accordingly, according to an embodiment of the present invention, the managing server 200 may enable the payment process to proceed after the buyer 300 identifies the seller 400 through the video taken of the seller 400.

Figure 7:
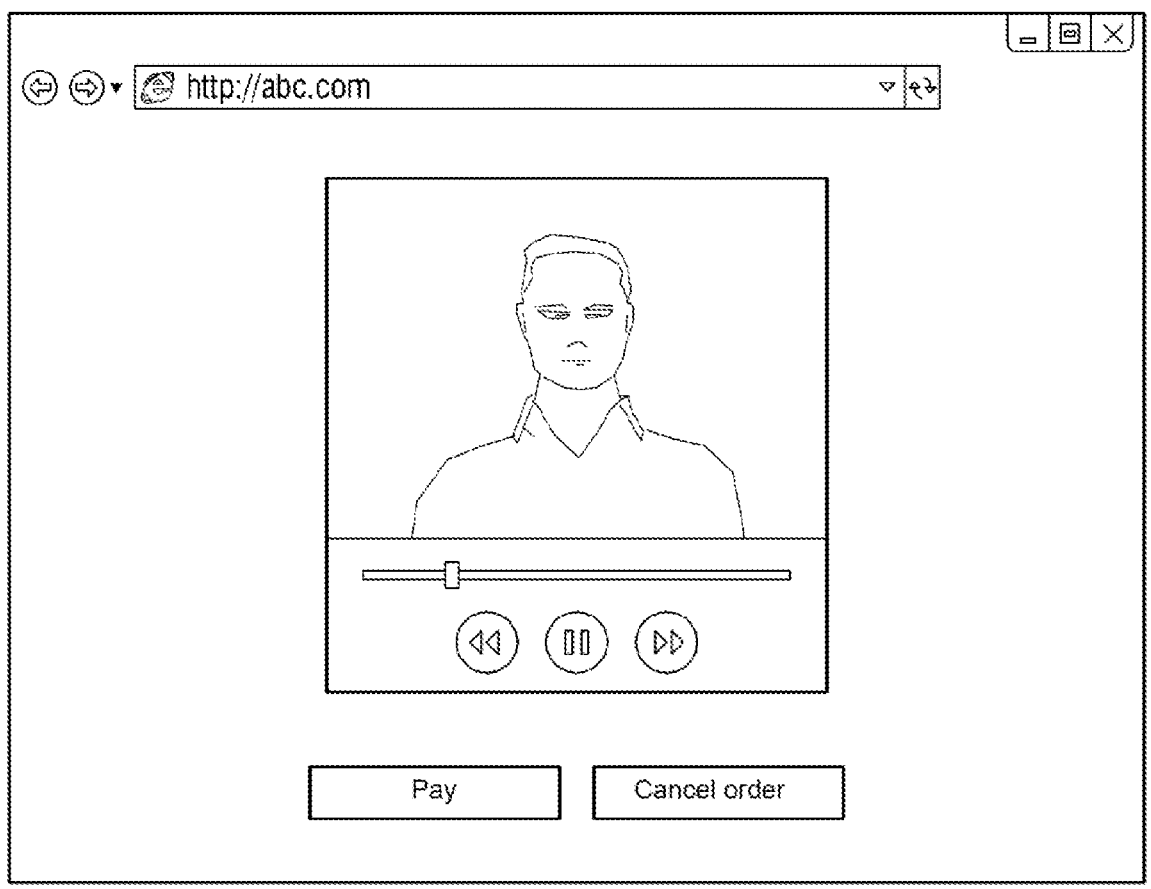
FIG. 7 is a view illustrating a process for proceeding with a payment procedure after identifying a video according to an embodiment of the present invention.

FIG. 7 is a view illustrating a process for performing a payment procedure after identifying a video according to an embodiment of the present invention.

If the buyer 300 selects the "Identify seller" menu item on the screen shown in FIG. 6, the video which has been taken through the terminal device of the seller 400 and received by the managing server 200 is displayed.

The video may contain an image of the seller 400 identifying the purchase request signal.

Since the video provided to the buyer 300 is not one previously registered by the seller 400 but one captured while the variation is identifying the purchase request signal of the buyer 300, the buyer 300 may reliably purchase the product from the seller 400.

In this case, the video provided to the buyer 300 may contain a message that the seller 400 intends to provide to the buyer 300, e.g., delivery schedule or stock information about the product, and the current state of the product or other information.

This may present similar effects to ones that may be achieved through traditional face-to-face transactions between buyer 300 and seller 400.

If the buyer 300 identifies the seller 400 and finally decides to purchase the product, the buyer 300 may proceed with the payment procedure by clicking the "Pay" button on the screen shown in FIG. 7.

In other words, since the payment procedure is performed after reliability builds up between the buyer 300 and the seller 400, damage to the buyer 300 may be prevented which may arise in electronic commerce.

In contrast, where the seller 400 is not identified from the video or the seller 400 in the photo previously registered differs from the seller 400 appearing in the video, the buyer 300 may select the "Cancel order" button to hold the purchase of product.

Since the seller 400, if he tries to sell abnormal goods, is typically reluctant to expose himself, if the seller 400 is not identified from the video, the buyer 300 may cancel the order.

As set forth above, allowing the buyer 300 to proceed with payment after identifying the seller 400 may prevent damages that may occur in electronic commerce.

Meanwhile, according to an embodiment of the present invention, the managing server 200 may provide only videos, from which the seller 400 may be identified, to the buyer 300 to provide correct information to the buyer 300.

In other words, since the seller 400 is typically reluctant to expose himself if he sells abnormal goods, he may prevent himself from being captured upon identifying the purchase request signal by, e.g., positioning himself out of camera angle or blocking the camera.

According to an embodiment of the present invention, the managing server 200 may send a request to retake if the video taken of the seller 400 is abnormal.

Figure 8:
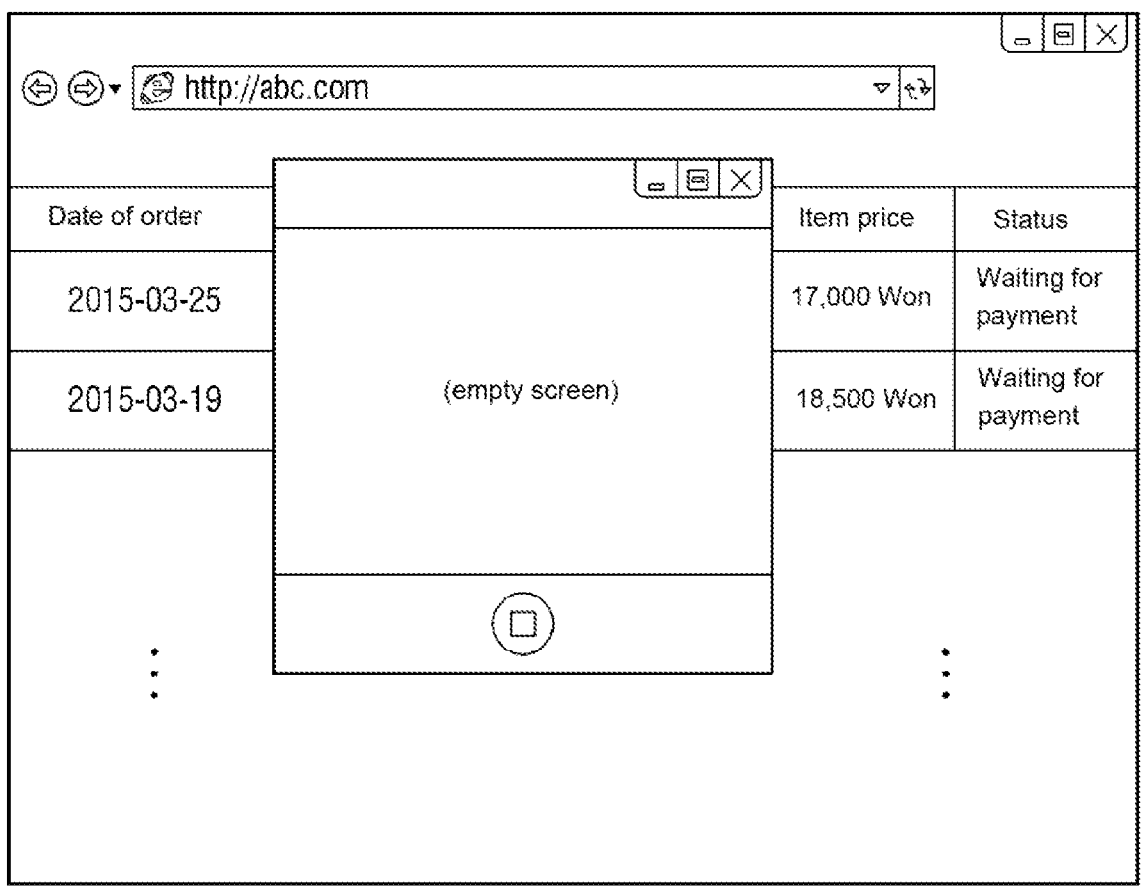
FIG. 8 is a view illustrating a process for requesting to re-take where a seller is not shown at a camera angle according to an embodiment of the present invention.

FIG. 8 is a view illustrating a process for requesting to retake when a seller is not positioned at a camera angle according to an embodiment of the present invention.

According to an embodiment of the present invention, the managing server 200 may send a request to retake upon determining that the seller 400 does not appear in the video taken of the seller 400 through face detection.

Specifically, the managing server 200 may detect the seller 400's face present in the video by performing, e.g., image filtering, binarization, edge detection, and face detection on the video taken by the terminal device of the seller 400.

According to an embodiment of the present invention, the managing server 200 may use one algorithm to detect the face of the seller 400 present in the video, among an eigenface scheme, distribution-based methods, neural networks, support vector machines (SVM), hidden markov model, naive bayes classifier, and boosting approach schemes.

However, other general-purpose algorithms than the schemes listed above may also be adopted to face the seller's face.

If the seller 400's face is not detected from the video through the above-described scheme, a request to retake may be made.

This is why it may be meaningless to transmit the video with no image of the seller's face to the buyer 300.

For example, as shown in FIG. 8, unless the seller 400's face is detected since the seller 400 is not positioned at the camera angle, a message to request to retake may be displayed.

However, although the seller's face is detected, it may be difficult to identify due to failure to detect the full face of the seller.

Figure 9:
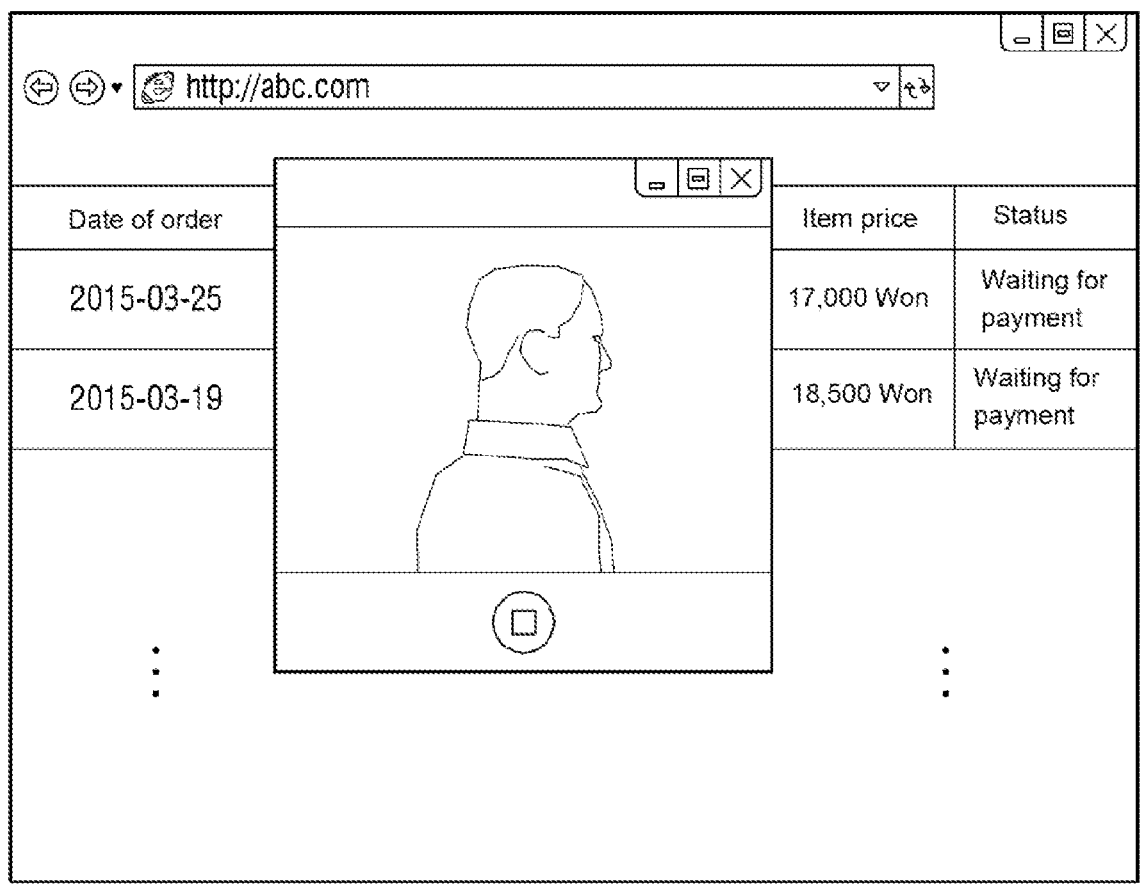
FIG. 9 is a view illustrating a process for requesting to re-take upon failing to take an image of a seller with the seller facing the camera, according to an embodiment of the present invention.

FIG. 9 is a view illustrating a process for requesting to retake upon failing to take a video of a seller so that the seller's full face is shown according to an embodiment of the present invention.

Although the video shows the seller 400, the seller's face may be impossible to identify as it is not for the seller's full face. Where the seller 400 intentionally or carelessly fails to capture his full face, although the video is sent to the buyer 300, the buyer 300 might not identify the seller 400.

Or, although the seller 400 is captured to include his full face, it may have defects due to, e.g., ambient illuminations or camera performance.

According to an embodiment of the present invention, the managing server 200 may make a request to retake unless feature points, e.g., feature points for the nose or mouth or the symmetrical eye shapes, which are shown from a human being, are extracted.

This helps the buyer 300 to purchase goods after identifying the seller 400 and building up reliability with the seller 400.

This may also prevent the seller 400 attempting an abnormal transaction from taking videos of others to hiding himself.

According to an embodiment of the present invention, the managing server 200 may previously register an image taken of the seller, compare the image with the video, and upon determining that the sellers shown in the image and the video are not the same one, make a request to retake.

Figure 10:
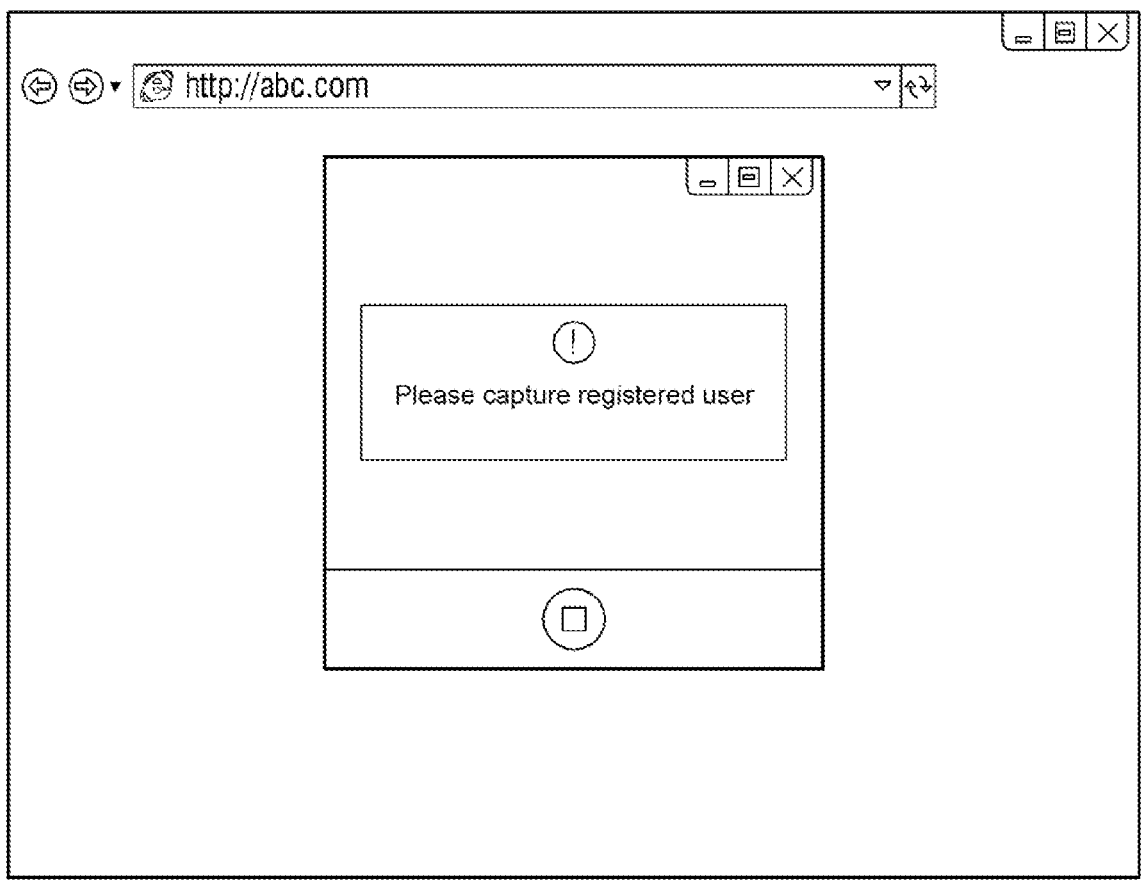
FIG. 10 is a view illustrating a process for requesting to re-take as per a result of comparison with a pre-registered photo according to an embodiment of the present invention.

FIG. 10 is a view illustrating a process for requesting to retake as per a result of comparison with a pre-registered photo according to an embodiment of the present invention.

The managing server 200 may previously store an image taken of the seller 400 which shows the full face of the seller 400. For example, when the seller 400 accesses the managing server 200 to enter information about goods for sale, the managing server 200 may register the image of the seller 400.

Thereafter, the managing server 200 may compare the pre-registered image of the seller 400 with the video taken of the seller 400 when the seller 400 identifies the purchase request signal of the buyer 300, and upon determining that the sellers differ from each other, the managing server 200 may make a request to retake.

Specifically, as shown in FIG. 10, the managing server 200 may display, to the seller 400, a message to request for enabling a video to be taken of the user registered.

This is to prevent a video showing other persons, but not the seller 400, from being provided to the buyer 300.

Specifically, the managing server 200 detects a human face from the captured video and extracts feature points from the face image. Thereafter, the managing server 200 may calculate similarities to pre-stored images through a classifier capable of classifying the extracted feature points to recognize face.

In this case, as a filter to extract the face feature points from the captured video, a gabor filter or a local binary pattern (LBP) filter may be used.

Further, as an algorithm to calculate the similarities to the pre-stored images, principal component analysis (PCA), fisher discriminant analysis (FDA), or independent component analysis (ICA) may be used.

However, algorithms used in the face recognition process are not limited thereto, and other general-purpose schemes may also be utilized.

Upon determining through the above processes that the pre-registered seller 400 differs from the seller 400 captured into the video, a message as shown in FIG. 10 may be displayed to request to retake.

Accordingly, according to an embodiment of the present invention, the electronic commerce method may provide a recognizable video captured for the seller 400, allowing the buyer 300 to safely purchase goods.

Meanwhile, although the managing server 200 repeatedly provide the message to request to retake, the seller 400 may reject to get him captured.

In this case, such seller 400 may be restricted not to sell goods through the managing server 200 to protect the buyer 300 from dishonest transactions.

Figure 11:
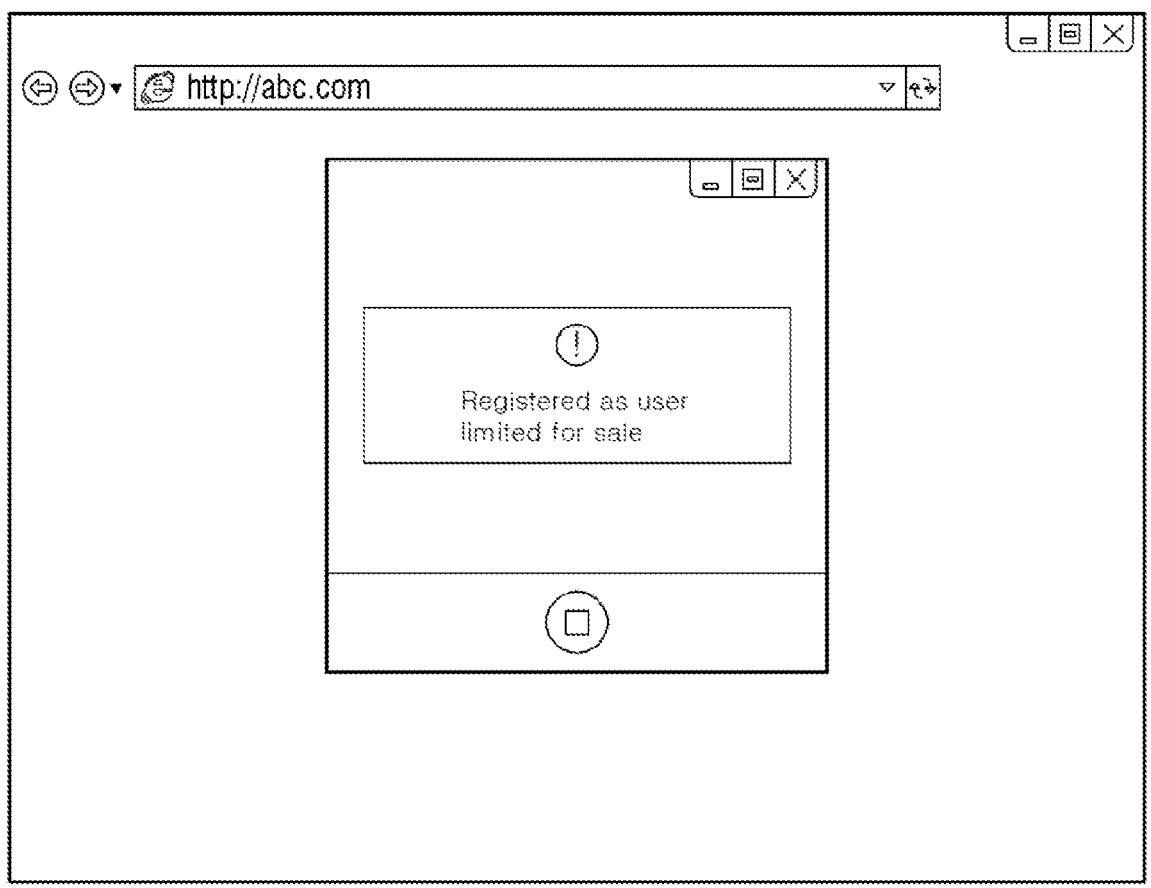
FIG. 11 is a view illustrating a process for generating a blacklist according to an embodiment of the present invention.

FIG. 11 is a view illustrating a process for generating a blacklist according to an embodiment of the present invention.

As described above in connection with FIGS. 8 to 10, where the seller 400's face is not detected or there is no image matching a recognized image among a plurality of images previously registered, a signal for requesting to retake may be transmitted.

Nonetheless, when the retaken video does not include the seller 400's face or an image of a user pre-registered, restrictions may be put on the seller 400 so that the seller 400 cannot sell goods through the electronic commerce method according to an embodiment of the present invention.

Specifically, where a video meeting a preset requirement is not taken within a preset number of times, a restriction may be set on the seller 400, preventing the seller 400 from selling goods.

Here, the preset requirement may be a minimum requirement where the seller 400's face may be recognized from a video taken of the seller 400. For example, the size of a recognized face and ratio of face recognition through the above-described algorithm may be set as the preset requirement.

The seller 400 for which a video meeting the preset requirement is not taken may be determined to be a seller 400 attempting to sell goods in an abnormal manner, and such sellers 400 may be listed in a blacklist to protect the buyer 300 against the sellers 300, and information thereabout may be provided to the buyer 300. Here, the blacklist may be a list of sellers 400 trying to sell goods in an abnormal way and means a list of sellers 400 who are restricted for sale.

Further, notification messages as shown in FIG. 11 may be sent to the sellers 400 listed in the blacklist so that the sellers 400 cannot sell goods any longer.

Meanwhile, information about the sellers listed in the blacklist may be provided to buyers, preventing damages due to dishonest transactions.

Figure 12:
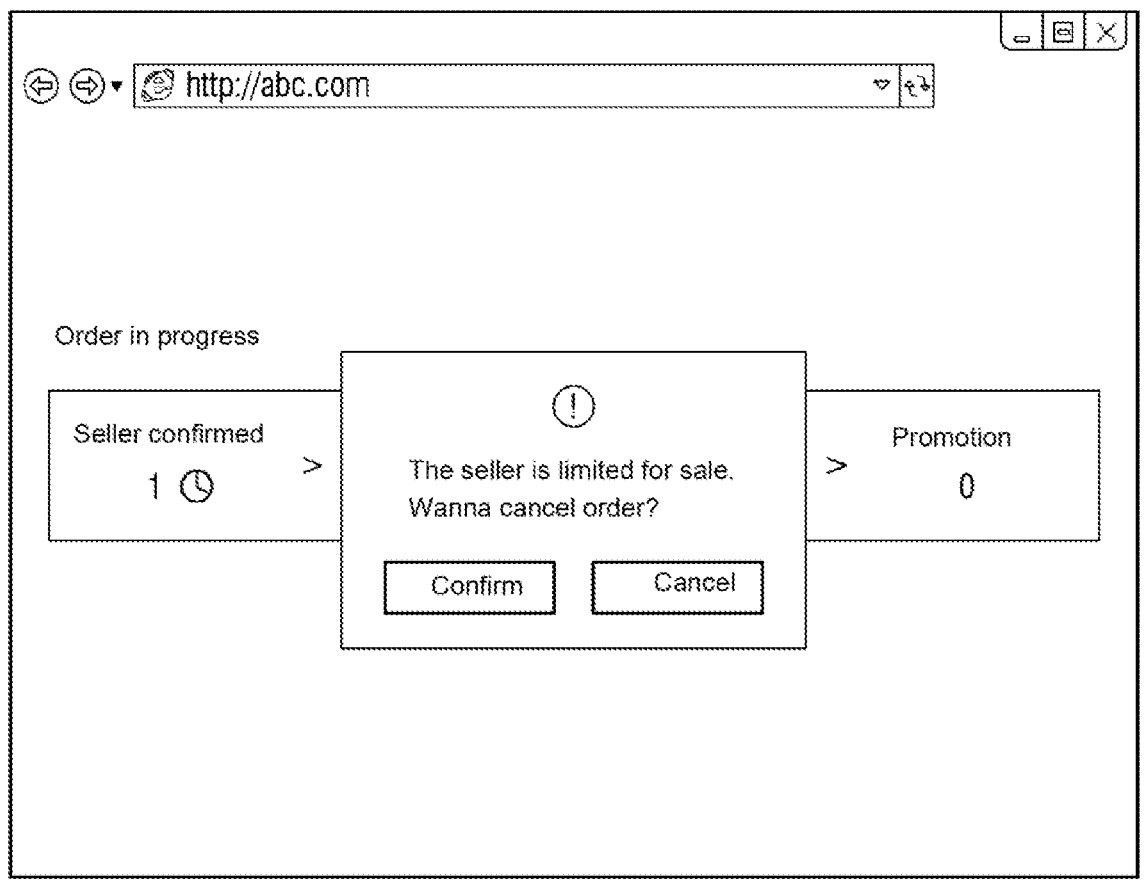
FIG. 12 is a view illustrating a process for providing information about a seller to buyers according to an embodiment of the present invention.

FIG. 12 is a view illustrating a process for providing information about a seller to buyers according to an embodiment of the present invention.

If the buyer 300 chooses a product from the seller 400 listed in the blacklist via the above-described processes, information thereabout may be provided to the buyer 300, preventing damages due to abnormal electronic transactions.

Specifically, a notification message as shown in FIG. 12 may be provided to the buyer 300 to induce the buyer 300 to cancel the order.

In some case, the seller 400 of the product that the buyer 300 purchases may be listed in the blacklist after the buyer 300 chooses the product.

For example, such an event may arise where the seller 400 is rendered to be listed in the blacklist by the seller 400's intentional avoidance when the seller 400 is captured upon identifying the purchase request signal of the buyer 300 as the buyer 300 orders the product.

Also in this case, a notification message as shown in FIG. 12 may be provided to the buyer 300 to induce the buyer 300 to cancel the order for the chosen product.

Thus, it is possible to prevent damage to the buyer 300 that may occur in electronic commerce.

Or, where the seller 400 repeatedly declines to get him captured, a relevant message may be provided to the buyer 300 to induce the display to cancel the order for the product.

Figure 13:
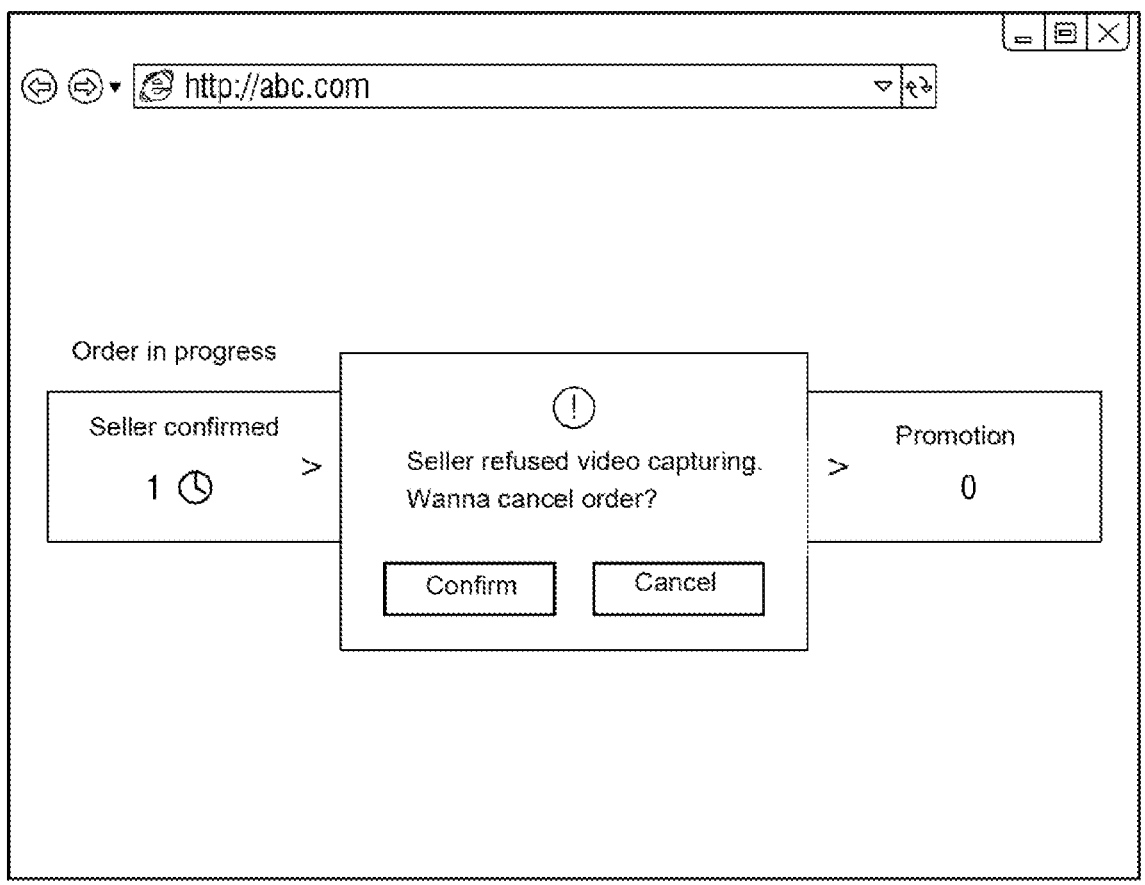
FIG. 13 is a view illustrating a process for notifying a buyer that a seller has rejected to take a video of him according to an embodiment of the present invention.

FIG. 13 is a view illustrating a process for notifying a buyer that a seller rejects to get him captured into a video.

In a case where the seller 400 repeatedly rejects to get him captured into video and so video capturing fails although a video taken of the seller 400's face should be provided to the buyer 300 during the course of the buyer 300 purchasing the product, the buyer 300 may be notified of this.

For example, where the video taken of the seller 400 does not show the seller 400, the seller 400's face cannot be identified from the video taken of the seller 400, or a different person from the seller 400 shows up in the video so that the video cannot be provided to the buyer 300, a message as shown in FIG. 13 may be provided to the buyer 300.

Thus, the buyer 300 may decide whether to continue the order for the product based on the message received from the managing server 200. Typically, if the seller 400 attempts an abnormal electronic transaction, the seller 400 would be reluctant to expose his face. In this case, the buyer 300 may be induced to cancel the order for product based on the message as shown in FIG. 13. Thus, the buyer 300 may be protected from fraud or other illegal electronic transactions.

Meanwhile, in the electronic commerce method according to an embodiment of the present invention, a separate identifier may be added to a product, which the seller listed in the blacklist is selling, in a list of goods.

Figure 14:
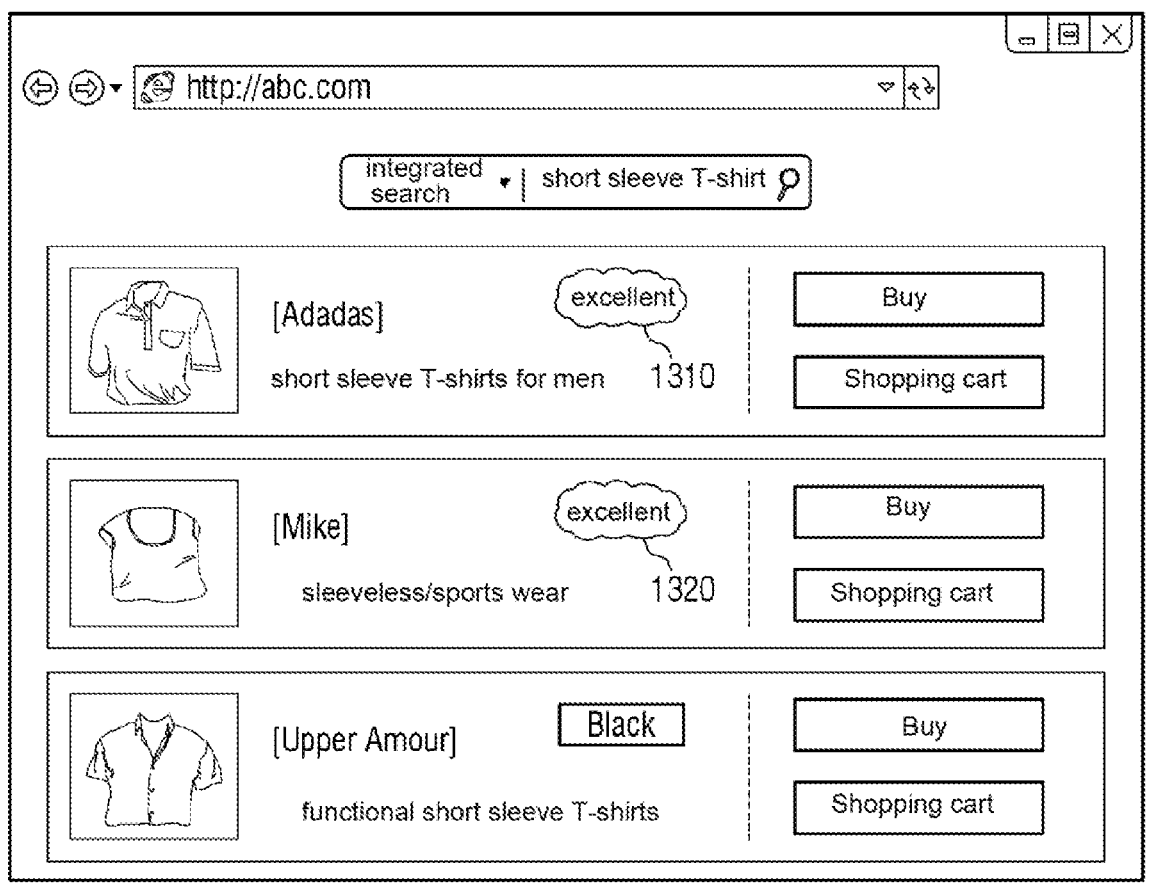
FIG. 14 is a view illustrating an example in which an identifier is added to a product that a seller registered in a blacklist is selling, according to an embodiment of the present invention.

FIG. 14 is a view illustrating an example in which an identifier is added to a product that a seller listed in a blacklist sells according to an embodiment of the present invention.

If the seller 400 listed in the blacklist registers a product for sale via the above-described processes, an identifier may be added to indicate that the product is sold by the seller 400 listed in the blacklist.

By contrast, an identifier to indicate an excellent seller may be added to a seller 400 certified as an excellent seller by a plurality of buyers 300.

In this embodiment, a first identifier 1310 and a second identifier 1320 indicate that their corresponding products are sold by the seller 400 who has been certified as an excellent seller.

Here, 'excellent sellers' mean sellers 400 of which videos meeting a preset requirement have been taken or sellers who have conducted a preset number of, or more, normal electronic transactions.

References for determining whether a seller is an excellent seller may be the number of normal electronic transactions performed or whether a video captured meets a preset condition.

In contrast, a third identifier 1330 indicates that its corresponding product is sold by the seller 400 listed in the blacklist.

Specifically, the seller 400 of the product with the third identifier 1330 added thereto may be a seller for whom it failed to take a video meeting the preset requirement within a preset number of times and who is reluctant to expose himself.

In other words, the seller 400 is highly likely to be one to try to sell goods in an abnormal manner. Thus, the third identifier 1330 is added to the product that such seller 400 sells, allowing the buyer 300 to reconsider the purchase of the product.

If the display selects the seller 400 with the third identifier 1330 added thereto, a reason for having listed in the blacklist may be displayed.

Figure 15:
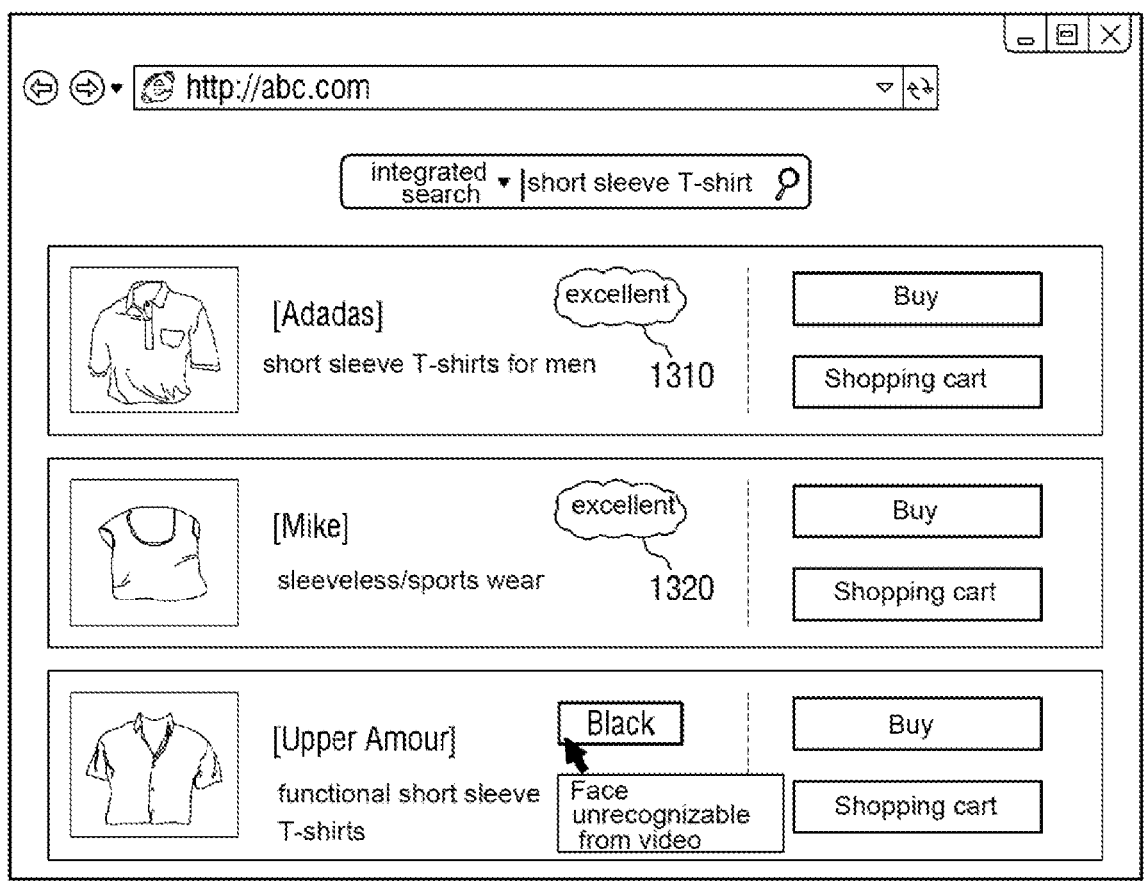
FIG. 15 is a view illustrating a process for displaying a reason for listing in a blacklist according to an embodiment of the present invention.

FIG. 15 is a view illustrating a process for displaying a reason why a seller has been listed in a blacklist according to an embodiment of the present invention.

If the user selects the third identifier 1330, the reason why the seller 400 with the third identifier 1330 added thereto, i.e., the seller 400 listed in the blacklist, has been listed in the blacklist.

For example, where the seller 400 avoids being captured for his face upon taking a video so that his face is not identified from the video, the specific reason may be provided to the buyer 300. Further, where video capturing fails, specific information about the number of times of the failure may also be displayed.

This helps the buyer 300 to decide whether she purchases the product that the seller 400 is selling.

A blacklist constituted of sellers 400 who have been restricted for sale of goods may be provided to buyers 300. Thus, the buyers 300 may easily identify whether the sellers 400 of the products that the buyers 300 desire to purchase are in the blacklist.

Figure 16:
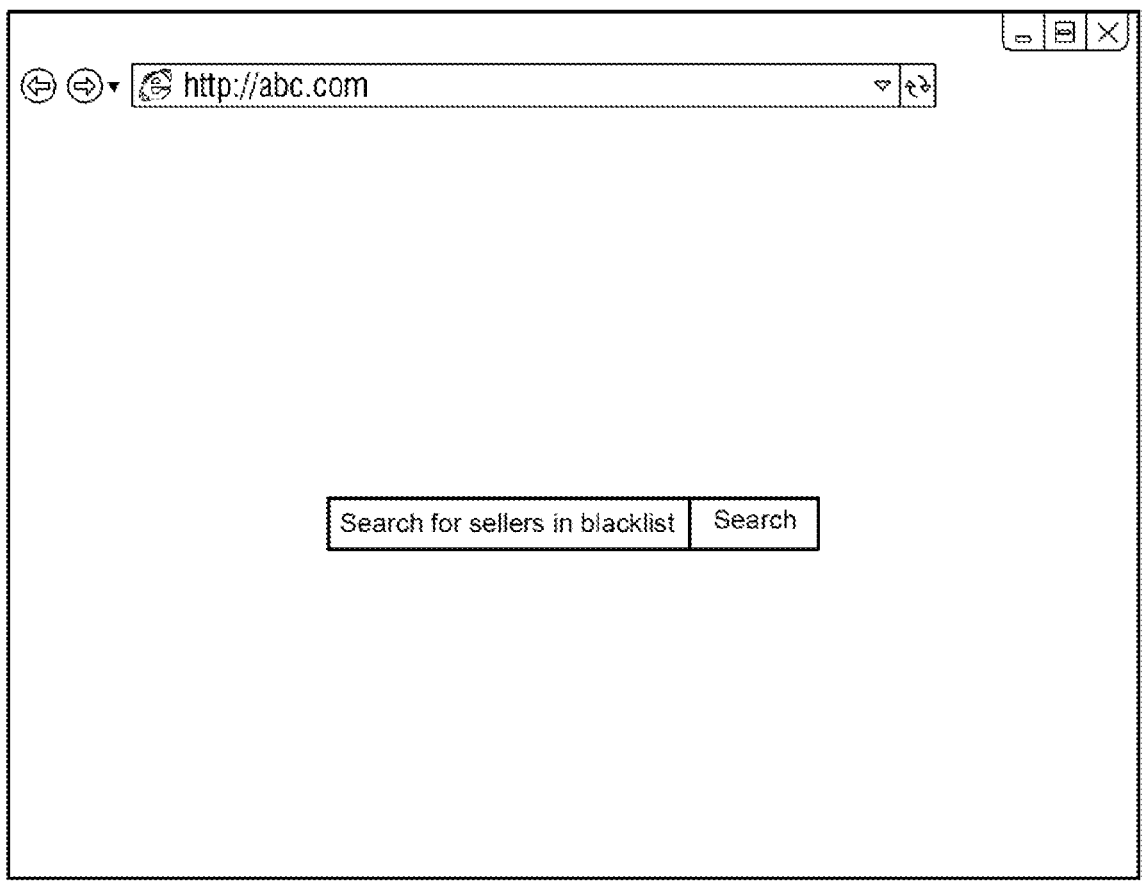
FIG. 16 is a view illustrating a blacklist that is provided to a seller according to an embodiment of the present invention.

FIG. 16 is a view illustrating a blacklist provided to a seller according to an embodiment of the present invention.

Information about the sellers 400 listed in the blacklist via the above-described processes may be provided to the buyers 300. For example, if the buyer 300 identifies the account of the seller 400 of the product that she desires to purchase and then enters the account on the screen shown in FIG. 16, the buyer 300 may identify whether the seller 400 using the account is one listed in the blacklist.

Since the sellers 400 listed in the blacklist would be reluctant to expose their face through the video taken according to an embodiment of the present invention, they are highly likely to be sellers who attempt abnormal electronic transactions.

Accordingly, electronic commerce damages may be prevented by inducing the buyers 300 not to purchase goods that are sold by the sellers 400 listed in the blacklist.

Figure 17:
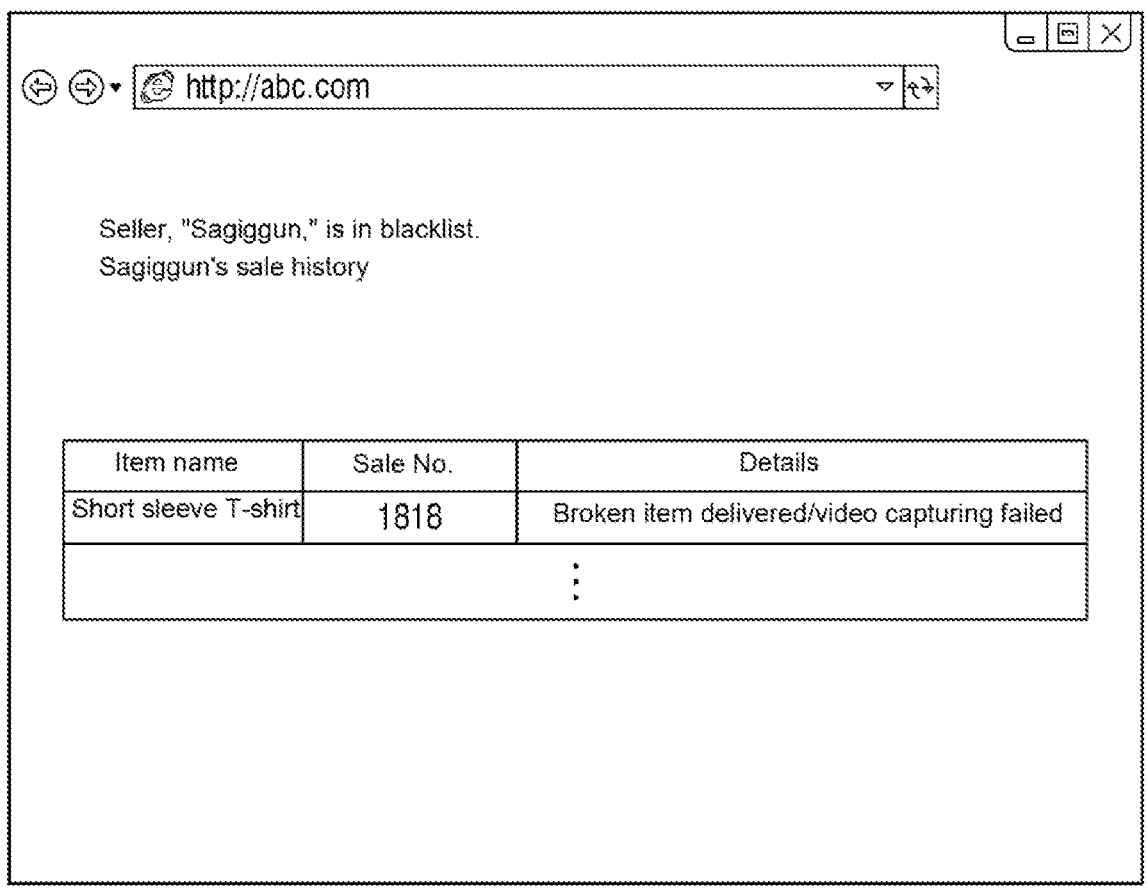
FIG. 17 is a view illustrating a process for providing a past sale history for a seller listed in a blacklist according to an embodiment of the present invention.

Meanwhile, the results of entry of the seller 400's account and searching by the buyer 300 may be displayed as shown in FIG. 17.

FIG. 17 is a view illustrating a process for providing a past sale history for a seller listed in a blacklist according to an embodiment of the present invention.

If the buyer 300 enters some seller 400's account, a past sale history for the seller 400 is displayed as shown in FIG. 17.

Specifically, whether the seller 400 using the account retrieved by the buyer 300 is in the blacklist, information about the goods sold in the past, and the reason why he has been listed in the blacklist may be displayed.

Accordingly, the buyer 300 may determine whether to purchase goods from the seller 400 by referring to the past sale history for the seller 400.

Meanwhile, in some cases, the seller 400 listed in the blacklist may attempt to sell goods through a different account. Thus, the electronic commerce method according to an embodiment of the present invention may recognize the face of the seller appearing in the video and provide reviews by other buyers 300 who have purchased goods from the seller.

Figure 18:
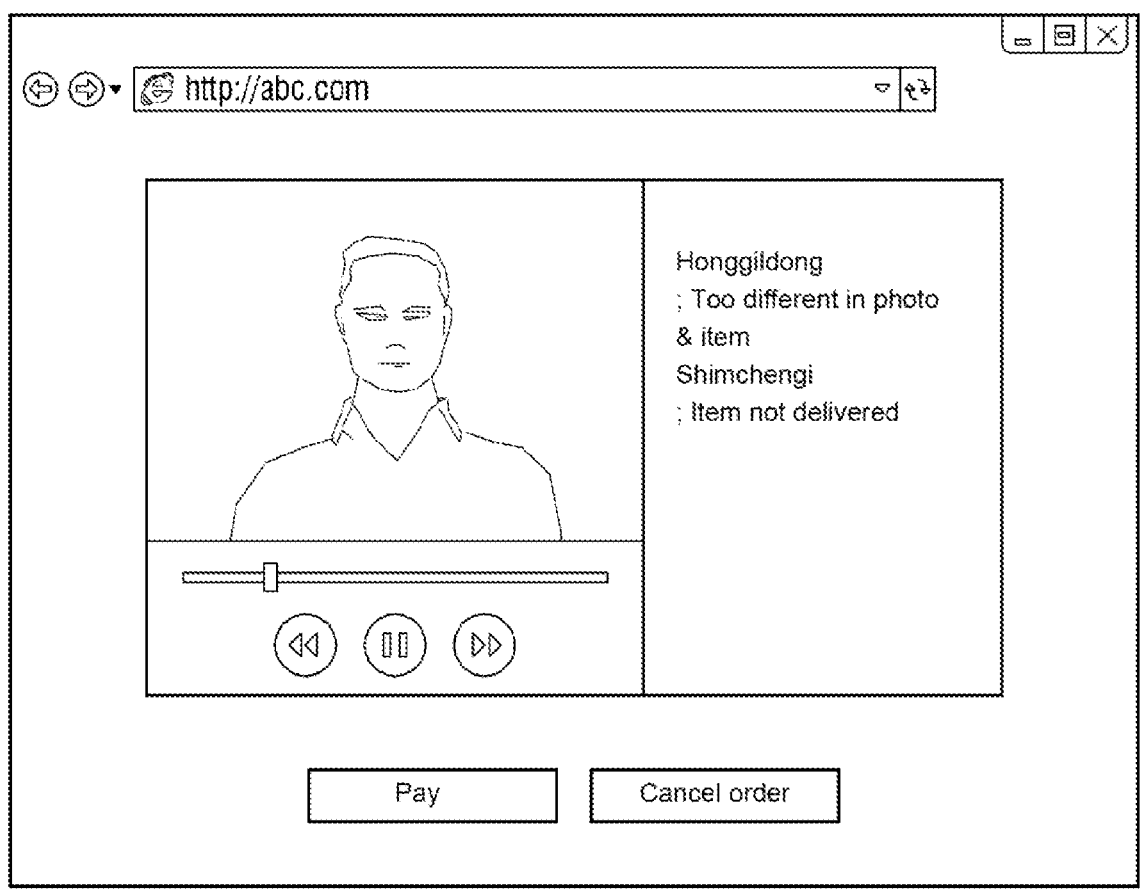
FIG. 18 is a view illustrating a process for providing a video taken of a seller, along with reviews of other buyers who have purchased goods from the seller, according to an embodiment of the present invention.

FIG. 18 is a view illustrating a process for providing a video taken of a seller along with reviews by other buyers who have purchased goods from the seller according to an embodiment of the present invention.

Such a case may occur where a seller 400 using an account "A" is listed in the blacklist and thus he cannot sell goods through the account. For example, where the seller 400 hides the camera or gets another captured to prevent a video taken of the seller 400 from being provided to the buyer 300 who has purchased a product, the seller 400 may resultantly be listed in the blacklist.

Thus, the seller 400 who cannot sell goods through account "A" may generate an account "B" in another person's name and attempt to sell goods.

Thus, according to an embodiment of the present invention, the electronic commerce method may recognize the seller 400's face from an image or video for the seller 400, match results of the recognition with reviews by buyers 300 who have purchased goods from the seller 400, and display the reviews of the other buyers 300 for the seller 400 even when the seller 400 uses a different account.

According to an embodiment of the present invention, the managing server 200 may register an image of the seller 400 using account "A," recognize the face from a video previously taken, and store a result of the recognition, along with the reviews of other buyers 300 who have purchased goods from the seller 400.

In other words, the managing server 200 may match the recognized face of the seller 400 with the reviews for the goods that the seller 400 have sold and store the recognized face and the reviews.

Accordingly, the managing server 200 enables the buyers 300 to identify sale history by displaying the reviews matching the recognized face of the seller 400 although the seller 400 uses a different account.

For example, upon providing the video taken of the seller 400 to the buyer 300 who purchases a product from the seller 400, the managing server 200 may recognize the seller 400's face and provide reviews corresponding to the recognized face.

In other words, this helps the buyers 300 to purchase goods trusting the seller 400 by allowing the buyers 300 to identify the sale history for other goods that have been sold by the seller 400.

Further, according to an embodiment of the present invention, when the account used by the seller 400 changes, the managing server 200 may provide the buyer 300 with an indication that the account has changed.

Figure 19:
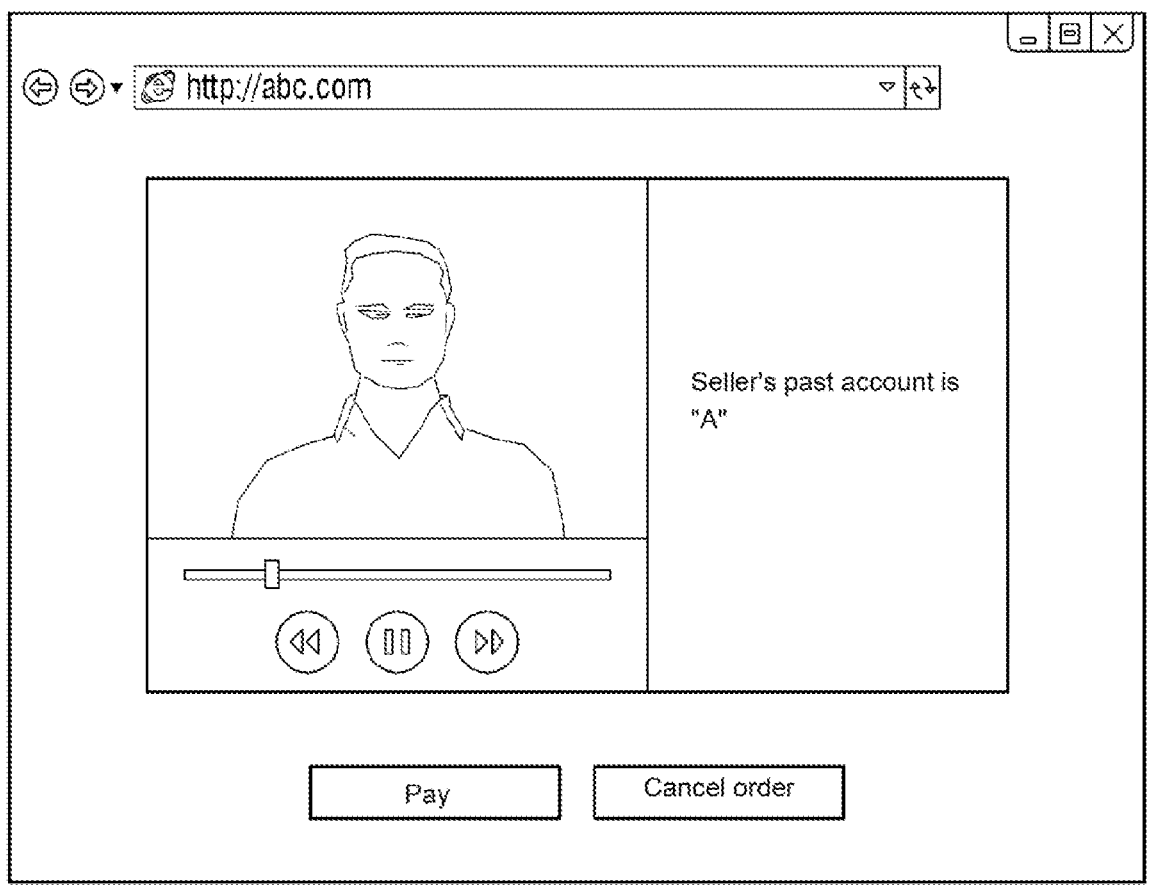
FIG. 19 is a view illustrating a process for providing a seller's account to a buyer when the seller's account is changed according to an embodiment of the present invention.

FIG. 19 is a view illustrating a process for providing an indication that a seller's account has changed to a buyer according to an embodiment of the present invention.

According to an embodiment of the present invention, after recognizing the seller 400's face from the video taken of the seller 400, the managing server 200 may match the recognized face with the seller's account.

For example, if the account that the seller 400 whose face has been recognized used in the past is account "A," and the current account that the seller 400 is using is account "B," information about the seller's past account "A" may be provided to the buyer 300 who has purchased a product from the seller 400 who used account "B."

Specifically, upon providing the video taken of the seller 400 to the buyer 300, the information about the past account that the seller 400 used may be provided. This is why the user may change accounts to hind the sale history after selling goods in a dishonest way using a particular account.

Upon identifying the past account of the seller 400 through the above-described method, the buyer 300 may identify the past sale history for the account and determine whether the seller 400 selling the product is reliable.

Accordingly, it may be prevented for dishonest users to sell goods while exchanging accounts.

Meanwhile, although in the above-described embodiment the seller 400 is a single private person, the seller 400 may be a legal organization or company constituted of multiple staff members. Accordingly, it may be difficult to determine who should be captured among the multiple staff members in providing a video taken of the seller 400 to the buyer 300.

Although any one of the multiple staff members is captured into video and the video is provided to the buyer 300, the buyer 300 may have difficulty in identifying whether the staff member is the actual seller 400.

According to an embodiment of the present invention, where the seller 400 is a legal organization or company constituted of multiple workers, the managing server 200 may previously register information about the workers and provide a video taken of one of the workers to the buyer 300.

Figure 20:
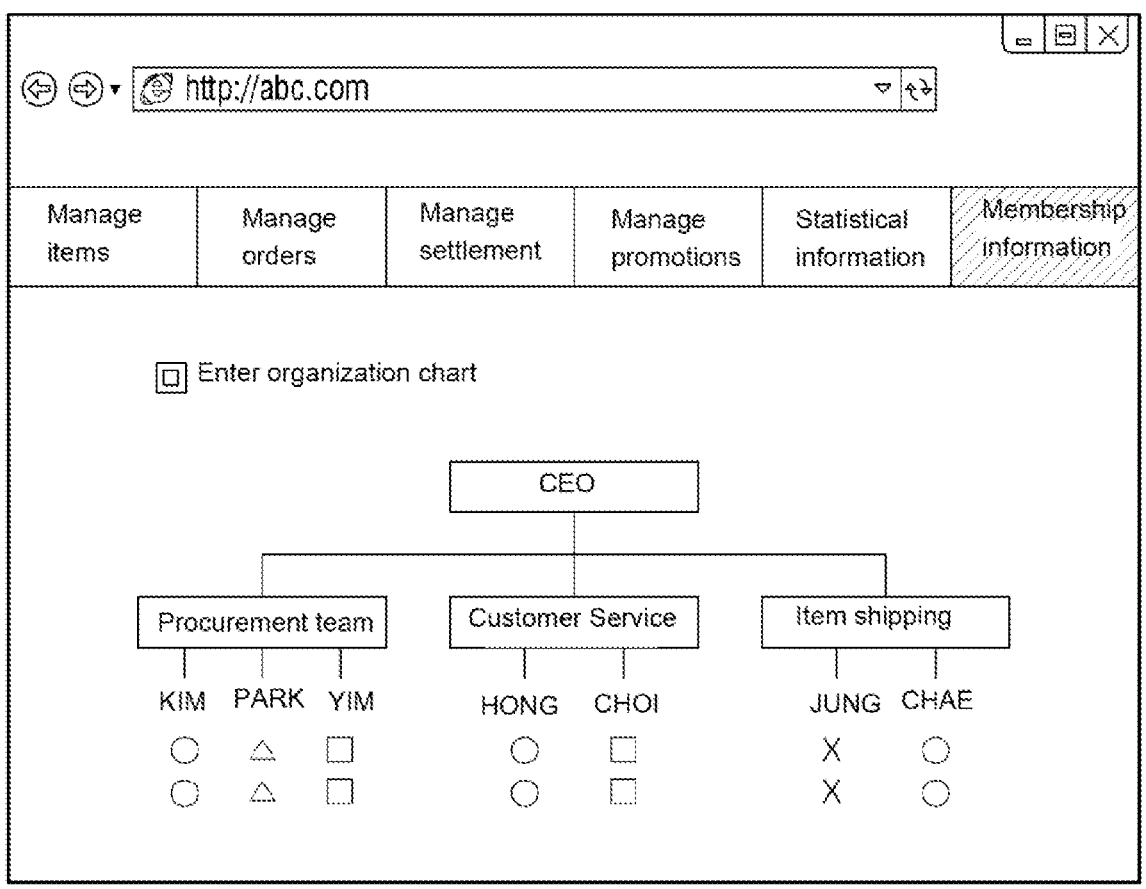
FIG. 20 is a view illustrating a process for registering information about staff of a sales company, according to an embodiment of the present invention.

FIG. 20 is a view illustrating a process for registering employee information from a selling company according to an embodiment of the present invention.

Where the seller 400 is a legal organization or company constituted of multiple workers, the managing server 200 may previously receive and store information about the workers. Specifically, as shown in FIG. 20, the managing server 200 may previously receive and store information about the organization chart for the legal organization or company, staff of the organization, personal information about the staff, and photos.

The workers registered as staff of the company may identify purchase request signal for goods that the company is selling. That is, since the ones who identify the purchase request signals are the staff of the selling company, a video taken of at least one of the workers of the selling company may be provided to the buyer 300.

Information about the staff of the selling company along with the taken of the worker identifying the purchase request signal may be provided because the video taken of the worker identifying the purchase request signal is sent to the buyer 300, and the buyer 300 identifying the same might not identify the figure appearing in the video, according to an embodiment of the present invention.

Thus, upon receiving the information about the staff of the selling company, for example, the organization chart of the selling company as shown in FIG. 20, the buyer 300 may identify the figure appearing in the video.

Accordingly, although purchasing goods sold by the legal organization or company constituted of multiple workers, the buyer may identify the worker in charge, and therefore, the buyer may trust the selling company in purchasing the goods.

Meanwhile, the photos of the workers are also registered when the information about the workers is previously received. Thus, the figure appearing in the video may be recognized and information about the figure may be provided as well.

Figure 21:
FIG. 21 is a view illustrating a process for providing a video, together with information about a figure appearing in the video, according to an embodiment of the present invention.

FIG. 21 is a view illustrating a process for providing a video along with information about a figure appearing in the video according to an embodiment of the present invention.

As set forth above, since images of multiple workers are registered in the managing server 200, the face of the figure appearing in the video may be recognized so that the video along with the information about the figure appearing in the video may be provided.

For example, the face of the figure appearing in the video may be compared with the pre-stored images of the multiple workers to recognize the figure appearing in the video, and a result of the recognition, along with the video, may be provided to the buyer 300.

Specifically, as shown in FIG. 21, information about the worker appearing in the video, along with the video, may be provided to the buyer 300 so that the buyer 300 may trust the selling company in purchasing goods.

To that end, the managing server 200 may detect the face of the worker appearing in the video by performing, e.g., image filtering, binarization, edge detection, and face detection on the video taken of the worker selling goods.

According to an embodiment of the present invention, the managing server 200 may use one of an eigenface scheme, distribution-based methods, neural networks, support vector machines (SVM), hidden markov model, naive bayes classifier, and boosting approach schemes as an algorithm to detect the face of the worker present in the video. However, the methods for detecting face may also be implemented to use other general-purpose algorithms than the above-listed schemes.

Figure 22:
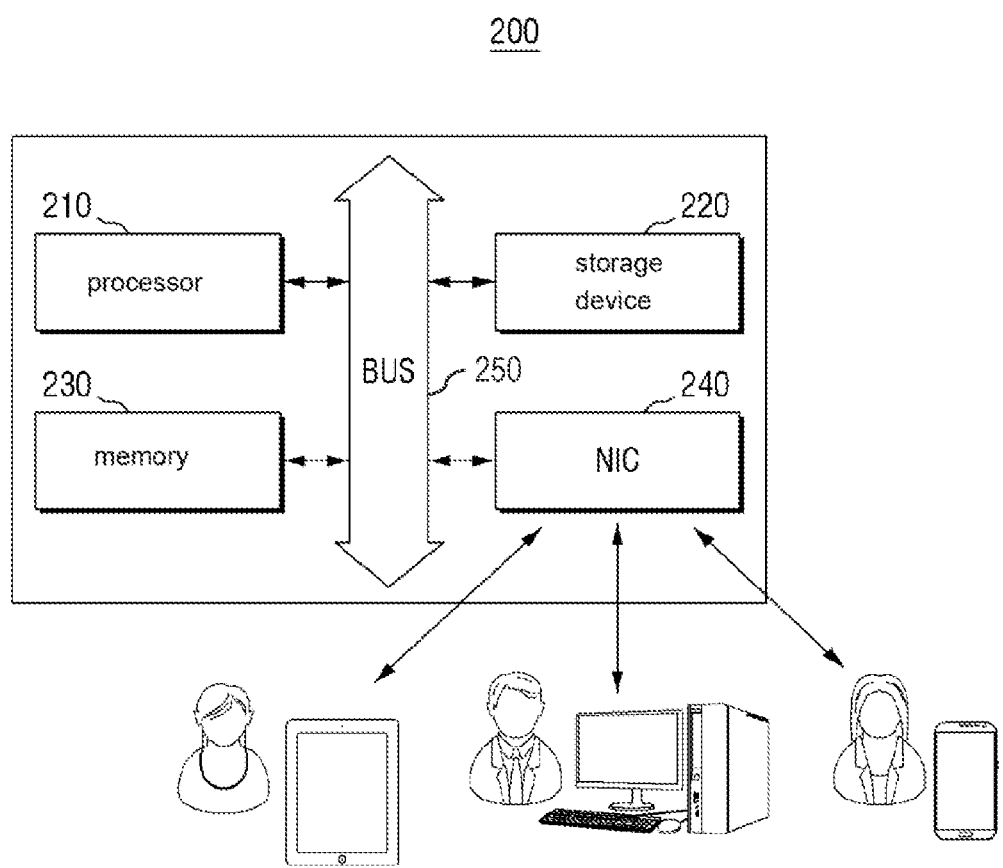
FIG. 22 is a block diagram illustrating a managing server 200 according to an embodiment of the present invention.

FIG. 22 is a functional block diagram illustrating the managing server 200 according to an embodiment of the present invention.

According to an embodiment of the present invention, the managing server 200 includes a processor 210, a storage device 220, a memory 230, a network interface (NIC) 240, and a bus 250.

However, the functional block diagram of FIG. 22 shows only components related to the instant embodiments. Accordingly, it would readily be appreciated by one of ordinary skill in the art that other general-purpose components than the components shown in FIG. 22 may be added.

The processor 210 executes an electronic commerce program. However, the present invention is not limited thereto and may be implemented to execute other programs. For example, the seller 400 identifying a purchase request signal of the buyer 300 may be captured, or a video taken of the seller 400 may be delivered to the buyer 300.

The storage device 220 stores the electronic commerce program. The storage device 220 may also store goods information registered by multiple sellers 400, personal information about the sellers 400, and videos taken of the sellers 400.

The memory 230 may load the electronic commerce program. The loaded electronic commerce program is executed by the processor 210.

Other computing devices are connected to the network interface 240. For example, the terminal devices used by the buyer 300 or sellers 400 may be connected to the managing server 200 via the network interface 240.

The bus 250 is connected with the processor 210, the storage device 220, the memory 230, and the network interface 240 and function as a data flow path.

Meanwhile, the above-described method may be created into an executable program and may be implemented in a general-purpose digital computer that operates the program using a computer readable recording medium. Further, the data architecture used in the above method may be recorded in a computer readable recording medium by various means. The computer readable recording medium includes a storage medium, such as a magnetic storage medium (e.g., ROM, floppy disk, or hard disk) or optical reading medium (e.g., CD-ROM or DVD).

It would readily be appreciated by one of ordinary skill in the art that various modifications may be made to the embodiments without departing from the essential features set forth herein. Thus, the methods disclosed herein should be construed not as limiting but as illustrating. The scope of the present invention is defined in the appending claims but not by the above description, and all possible equivalents thereto should be interpreted as belonging to the scope of the present invention.

What is claimed is:

1. An electronic commerce method, the method being performed by a managing server including a processor, a storage device, a memory, a network interface (NIC), and a bus, the method comprising steps of:

receiving a purchase request signal from a buyer;

transmitting the purchase request signal to a seller wherein the seller identifies who the buyer is and how many products the buyer purchases through the purchase request signal provided from the managing server, and the managing server divides a purchase procedure into multiple purchase steps and displays the multiple purchase steps on a screen, the multiple purchase steps comprising a status of delivery of goods for multiple buyers;

receiving a video taken of the seller identifying the purchase request signal;

transmitting the received video to the buyer;

putting a restriction on the seller so that the seller cannot sell goods upon failing to receive a video taken of the seller that meets a preset requirement within a preset number of times;

generating a blacklist constituted of sellers restricted not to sell goods; and adding identifiers indicating that goods are sold by the sellers listed in the blacklist to the goods registered by the sellers listed in the blacklist, wherein the video taken of the seller is taken when the seller identifies product purchase information contained in the purchase request signal;

a video capturing function is activated when the seller identifies the product purchase information and remains active for a preset time, and when the preset time elapses, the video capturing function is terminated; and the step of receiving the video taken of the seller includes steps of detecting the seller's face from the video by performing image filtering, binarization, edge detection, and face detection on the video by the managing server, and unless the seller's face is detected, transmitting a signal to request to retake the video.

2. The electronic commerce method of claim 1, wherein the step of receiving the video taken of the seller includes a step of notifying the buyer that the video taken of the seller has been received.

3. The electronic commerce method of claim 1, further comprising a step of performing payment upon receiving a final confirm signal from the seller, wherein the seller's face was detected from the video.

4. The electronic commerce method of claim 1, wherein the step of receiving the video taken of the seller includes steps of extracting a face feature point from the detected face of the seller, and transmitting a signal to request to retake the video when the face feature point is not detected.

5. The electronic commerce method of claim 1, wherein the step of receiving the video taken of the seller includes steps of comparing the detected face of the seller with a plurality of images previously stored, and when none of the plurality of images match the detected face of the seller, sending a signal to request to retake the video.

6. The electronic commerce method of claim 1, wherein the step of transmitting the received video includes steps of recognizing the face of the seller appearing in the video and transmitting a review corresponding to the recognized face of the seller along with the video.

7. The electronic commerce method of claim 1, further comprising a step of, when the seller is a legal organization or company constituted of a plurality of staff members, receiving information about the plurality of staff members, wherein the step of transmitting the video to the buyer includes steps of recognizing a face of a staff member appearing in the video and transmitting the information about the recognized staff member along with the video.

8. A computer program recorded in a non-transitory storage medium to execute, in association with a managing server including a processor, a memory, a network interface (NIC), and a bus, steps of:

receiving a purchase request signal from a buyer, transmitting the purchase request signal to a seller, receiving a video taken of the seller identifying the purchase request signal, transmitting the received video to the buyer, putting a restriction on the seller so that the seller cannot sell goods upon failing to receive a video taken of the seller that meet a preset requirement within a preset number of times, generating a blacklist constituted of sellers restricted not to sell goods, and adding identifiers indicating that goods are sold by the sellers listed in the blacklist to the goods registered by the sellers listed in the blacklist, wherein the seller identifies who the buyer is and how many products the buyer purchases through the purchase request signal provided from the managing server; and the managing server divides a purchase procedure into multiple purchase steps and displays the multiple purchase steps on a screen, the multiple purchase steps comprising a status of delivery of goods for multiple buyers, wherein the video taken of the seller is taken when the seller identifies product purchase information contained in the purchase request signal;

a video capturing function is activated when the seller identifies the product purchase information and remains active for a preset time, and when the preset time elapses, the video capturing function is terminated; and the step of receiving the video taken of the seller includes steps of detecting the seller's face from the video by performing image filtering, binarization, edge detection, and face detection on the video by the managing server, and unless the seller's face is detected, transmitting a signal to request to retake the video.

* * * * *